US012075767B2

(12) United States Patent
Chase

(10) Patent No.: US 12,075,767 B2
(45) Date of Patent: Sep. 3, 2024

(54) INSECT BEHAVIOR BASED MANAGEMENT APPARATUS AND METHODS THEREOF

(71) Applicant: Terry Chase, Georgetown, TX (US)

(72) Inventor: Terry Chase, Georgetown, TX (US)

(73) Assignee: Terry Chase, Bryan, TX (US)

(*) Notice: Subject to any disclaimer, the term of this patent is extended or adjusted under 35 U.S.C. 154(b) by 0 days.

(21) Appl. No.: 17/454,680

(22) Filed: Nov. 12, 2021

(65) Prior Publication Data

US 2022/0142137 A1 May 12, 2022

Related U.S. Application Data

(60) Provisional application No. 63/112,793, filed on Nov. 12, 2020.

(51) Int. Cl.
*A01M 1/04* (2006.01)
*A01K 5/02* (2006.01)
*A01K 39/01* (2006.01)

(52) U.S. Cl.
CPC .............. *A01M 1/04* (2013.01); *A01K 5/02* (2013.01); *A01K 39/01* (2013.01)

(58) Field of Classification Search
CPC .................................. A01K 5/02; A01M 1/04
See application file for complete search history.

(56) References Cited

U.S. PATENT DOCUMENTS

| 4,019,459 A * | 4/1977 | Neff .................. A01K 67/02 119/223 |
| 5,630,374 A * | 5/1997 | Cunningham ......... A01K 97/04 119/6.5 |
| 6,758,162 B1 | 7/2004 | Heygen |

(Continued)

FOREIGN PATENT DOCUMENTS

JP 4533988 B2 9/2010

OTHER PUBLICATIONS

Taylor Crane, the Best Reptile Feeder Ever?! | Zen Habitats Reptile Feeder, (Feb. 23, 2020), Accessed: Sep. 28, 2021, [Online Video] <https://www.youtube.com/watch?v=JKf05YIrQHQ>.

(Continued)

*Primary Examiner* — Joshua J Michener
*Assistant Examiner* — Nicole Paige Maccrate
(74) *Attorney, Agent, or Firm* — Thompson Patent Law Offices PC

(57) ABSTRACT

Apparatus and associated methods relate to selectively inducing ingress and/or egress of live food creatures (FCs) relative to a reservoir using a controllable light source based on innate behavior(s) of the FCs. In an illustrative example, a feeder for dispensing live food to a carnivore may have a (partially) opaque chamber configured to receive FCs. A controlled light source may, for example, be selectively operable to illuminate at least part of the chamber. A carnivore interface may, for example, be in communication with the chamber via at least one dispensing aperture and be configured to present a dispensed FC to the carnivore. Operation of the controlled light source in a dispensing mode may induces motion of the FCs in the chamber towards the carnivore interface to be presented as food to the carnivore. Various embodiments may advantageously induce self-dispensing and/or self-retention of insects as food.

20 Claims, 12 Drawing Sheets

(56) References Cited

U.S. PATENT DOCUMENTS

| | | |
|---|---|---|
| 7,174,847 B1 | 2/2007 | Hulteen, III |
| 7,464,664 B2 | 12/2008 | Vadis |
| 8,944,007 B2 | 2/2015 | Bagnall |
| 2002/0069829 A1 | 6/2002 | McMahon |
| 2014/0261211 A1* | 9/2014 | Tuan ...................... A01K 61/85 |
| | | 119/51.01 |
| 2020/0022333 A1* | 1/2020 | Smith .................. A01K 5/0291 |

OTHER PUBLICATIONS

Verge Pets, Introducing the Automatic Reptile Feeder, (Apr. 24, 2018), Accessed: Sep. 28, 2021, [Online Video], <https://www.youtube.com/watch?v=jhZ7r3xSNJo>.

* cited by examiner

INSECT BEHAVIOR BASED MANAGEMENT APPARATUS AND METHODS THEREOF

CROSS-REFERENCE TO RELATED APPLICATIONS

This application claims the benefit of U.S. Application Ser. No. 63/112,793, titled "Insect Behavior Based Management Apparatus and Methods Thereof," filed by Terry Chase on Nov. 12, 2020.

This application incorporates the entire contents of the foregoing application(s) herein by reference.

TECHNICAL FIELD

Various embodiments relate generally to feeding carnivores.

BACKGROUND

Various creature may be kept and/or cared for by humans. For example, insectivores may be kept as pets. Various carnivores may be kept for exhibition (e.g., zoos) and/or study (e.g., research institutions). Carnivores may, for example, be raised as livestock.

Carnivores may be fed live food creatures. For example, insectivores such as lizards may be fed arthropods (e.g., insects, spiders). Some carnivores may be fed larval stages of food creatures (e.g., darkling beetle larvae, black soldier fly maggots). Some carnivores may, for example, consume annelids (e.g., 'worms'). Fish may be fed insects, amphibians, small mammals, and/or small fish. Predatory insects (e.g., praying mantises) may, for example, consume other insects. Anteaters may eat ants and/or other insects. Birds may, for example, consume arthropods and/or annelids. Live food may include, for example, invertebrates and/or other animals. Some carnivores may, for example, consume both live food creatures and vegetation (e.g., omnivores).

SUMMARY

Apparatus and associated methods relate to selectively inducing ingress and/or egress of live food creatures (FCs) relative to a reservoir using a controllable light source based on innate behavior(s) of the FCs. In an illustrative example, a feeder for dispensing live food to a carnivore may have a (partially) opaque chamber configured to receive FCs. A controlled light source may, for example, be selectively operable to illuminate at least part of the chamber. A carnivore interface may, for example, be in communication with the chamber via at least one dispensing aperture and be configured to present a dispensed FC to the carnivore. Operation of the controlled light source in a dispensing mode may induces motion of the FCs in the chamber towards the carnivore interface to be presented as food to the carnivore. Various embodiments may advantageously induce self-dispensing and/or self-retention of insects as food.

Various embodiments may achieve one or more advantages. For example, some embodiments may advantageously provide selective dispensing of live food creatures, such as arthropods, by way of example and not limitation. In various embodiments, a guide surface(s) may advantageously guide live food creatures towards a dispensing aperture. Various embodiments may advantageously selectively operate to control an environment such that live food creatures (e.g., insects) are induced by their natural behavior to exit a container to a carnivore interface.

In various embodiments, live food creatures may, for example, be advantageously retained in a reservoir by phototaxis and/or surface taxis. Such embodiments may, for example, advantageously prevent the live food from escaping.

Exemplary embodiments may, for example, advantageously reduce or eliminate moving parts. Embodiments with reduced or eliminated moving parts may advantageously reduce damage to the food creatures during dispensing. Embodiments with reduced or eliminated moving parts may, for example, advantageously reduce manufacturing cost and/or user maintenance requirements.

Various embodiments may advantageously increase feeding efficiency and/or reduce a number of unwanted creatures in a pet environment (e.g., a home). Such embodiments may, by way of example and not limitation, reduce feeding costs (e.g., by reducing a number of creatures that escape) and/or unwanted creatures in an environment (e.g., the carnivore's enclosure, a zoo, a pet owner's house).

815. Various such embodiments may advantageously enable collection, cleaning, and/or dispensing of food creatures from a reservoir without direct handling of the food creatures. Embodiments may advantageously reduce human allergies (e.g., of handlers, caretakers) and/or enable enlisting of assistance in feeding insectivores.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
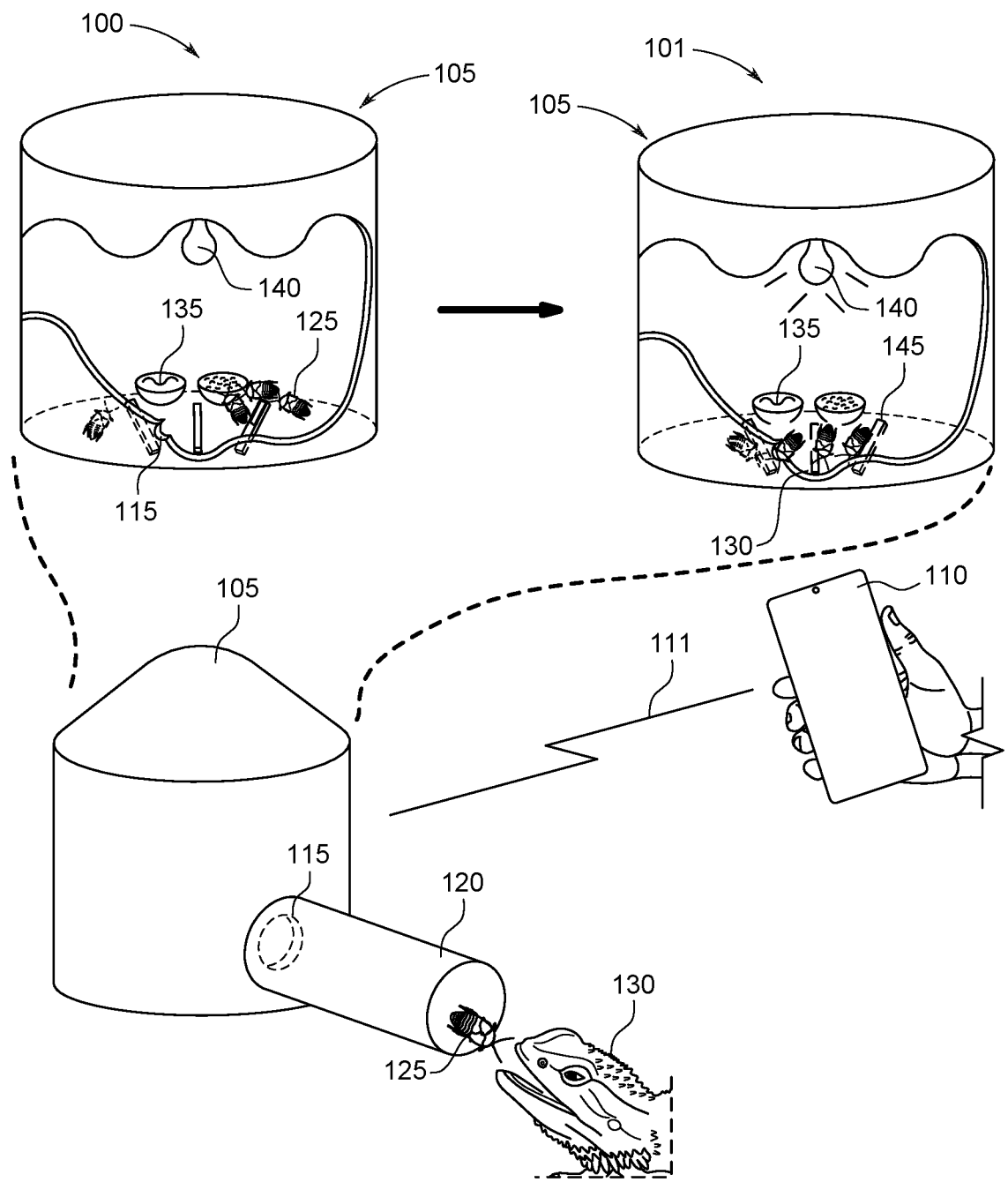
FIG. 1 depicts an exemplary live food phototaxis-inducing feeder (LFPIF) in an illustrative use-case scenario.

To aid understanding, this document is organized as follows. First, to help introduce discussion of various embodiments, live food taxis-inducing dispensing systems are introduced with reference to FIGS. 1-7. Second, with reference to FIG. 8, a taxis-inducing live food collection system is described. Fourth, with reference to FIG. 9, the discussion turns to exemplary embodiments that illustrate a taxis-inducing live food cleaning system. Fifth, and with reference to FIG. 10, this document describes exemplary apparatus and methods useful for taxis-inducing live food sorting. Finally, the document discusses further embodiments, exemplary applications and aspects relating to live food taxis-inducing systems.

Many animals may innately fly and/or crawl towards or away from stimuli such as light, moisture, chemicals (pheromones), temperature gradients, surfaces and movement. This innate behavior may be referred to as 'taxis.' As an illustrative example, a creature moving toward lights outdoors at night is a phenomenon known as positive phototaxis. Conversely, the phenomenon of moving away from a light source is called negative phototaxis. Thermotaxis, for example, is the phenomenon of a creature moving directionally along in response to a gradient in temperature (e.g., towards lower temperature, towards higher temperature). Thigmotaxis may refer to movement near a physical difference in the environment. As an illustrative example, a mouse preferring to run along an edge and/or into a corner is thigmotaxis.

Animals may exhibit taxis to a combination of stimuli such as, for example, a rat running from light (phototaxis) towards a corner (thigmotaxis). As another illustrative example, a roach may flee light (phototaxis) and the heat it generates (thermotaxis) by skittering along a shadow or surface feature (thigmotaxis). Animals may taxis to levels or types of light or stimuli that are invisible to humans and/or other animals such as, by way of example and not limitation, phototaxis response to ultraviolet, infrared, and/or polarized light.

Arthropods, for example, may taxis to different stimuli throughout their lifecycle. As an illustrative example, may fly larvae may taxis toward moisture (thigmotaxis) and decomposition (chemotaxis), whereas adult flies may taxis toward light (positive phototaxis). Many arthropods exhibit strong involuntary responses to (artificial) stimuli, and may even taxis until death, such as a moth to a flame (strong positive phototaxis).

Animal husbandry may often benefit from feeding live food creatures to carnivores. Many animals may, for example, only eat live food creatures. Live food creatures may enhance husbandry by providing carnivores opportunity to use natural behaviors, such as hunting, for example.

When feeding live food creatures, animal caretakers may use various methods by feeding with tongs, using escape-proof bowls, dispensing containers, and/or introducing live food creatures into containing husbandry cages and/or enclosures with a carnivore. Various embodiments disclosed herein may advantageously solve problems which may occur in such scenarios, such as by leveraging innate taxis behaviors to automatically dispense, collect, retain and/or sort live food creatures. As an illustrative example, various embodiments may advantageously prevent live food creatures from escaping a dispensing container. Some embodiments may advantageously prevent live food creatures from evading a carnivore. Various implementations may advantageously prevent food creatures from escaping into the environment. In some embodiments configured to control food creature responses based on innate taxis behaviors without direct contact of humans with the food creatures, disgust and/or negative interaction with the human caretaker may be advantageously avoided and/or the food creature may advantageously be prevented from being killed (and so wasted) during handling.

Various embodiments may advantageously solve problems which make feeding live arthropods as food creatures difficult. For example, many arthropods may easily escape and/or may die easily in response to mechanical manipulation. Some embodiments may advantageously provide automatic dispensing to pets, thereby reducing husbandry difficulties. For example, such embodiments may advantageously reduce husbandry burdens for juvenile bearded dragons, which may need to consume live food frequently. Embodiments enabling automatic and/or non-contact feeding may, by way of example and not limitation, advantageously decrease pet owner interaction with arthropods and so avoid allergies, disgust and/or escape of arthropods (e.g., crickets and roaches) into the pet owner's home. Some such embodiments may advantageously prevent escape of live food creatures (e.g., arthropods) from commercially available live food creature dispensers for reptile husbandry having containers with holes or slots from which arthropods may easily escape. Accordingly, such embodiments may advantageously prevent live food creatures (e.g., crickets) from escaping containers and biting the carnivore (e.g., reptile), such as while the carnivore sleeps.

FIG. 1 depicts an exemplary live food phototaxis-inducing feeder (LFPIF) in an illustrative use-case scenario. In the depicted scenario, an LFPIF 105 is configured to communicate with a mobile device 110 by a wireless link 111. The LFPIF 105 is provided with a chamber and an aperture 115 into the chamber. The aperture 115 leads from within the chamber of the LFPIF 105 into a carnivore interface 120. As depicted, the carnivore interface 120 is a feeding spout. When the LFPIF 105 is operated into a dispensing mode in response to a command(s) conveyed from the mobile device 110 to the LFPIF 105 via the wireless link 111, the LFPIF 105 is operated to induce a live food creature 125 (e.g., a roach, such as a Dubia roach, as depicted) to exit the LFPIF 105 via the aperture 115. Accordingly, the live food creature 125 may enter the carnivore interface 120 and be presented to a carnivore 130 (e.g., an insectivore such as a bearded dragon, as shown) for food. Accordingly, various embodiments may advantageously provide selective dispensing of live food creatures, such as arthropods (e.g., spiders, insects, larvae such as beetle larvae), by way of example and not limitation.

In the depicted example, the chamber of the LFPIF 105 contains Dubia roaches. Many roaches (including Dubia roaches) are negative phototaxis creatures, meaning that they tend to move (taxis') in response to light (phototaxis), and specifically that they tend to move from more light to less light (negative phototaxis). In a retaining mode 100, the live food creatures 125 are in the chamber. For example, the chamber contains food and/or water source 135. A controllable light source 140 is depicted as being off. The walls of the LFPIF 105 may be at least partially opaque. Accordingly, an interior of the chamber of the LFPIF 105 may be darker than an exterior. Therefore, the live food creature 125 may avoid approaching the aperture 115. In the retaining mode 100, therefore, the live food creature 125 may, for example, be advantageously retained in the LFPIF 105 by negative phototaxis.

The LFPIF 105 may be (selectively) operated between the retaining mode 100 and a dispensing mode 101. For example, the controllable light source 140 may be operated "on" in response to a signal from the mobile device 110 via the wireless link 111. In the dispensing mode 101, the interior of the chamber of the LFPIF 105 may, for example, be brighter than the exterior of the chamber (e.g., the entire exterior of the chamber may not be (currently) illuminated). Accordingly, as depicted in the dispensing mode 101, the live food creatures 125 may be induced by negative phototaxis to seek the aperture 115. Various such embodiments may advantageously selectively operate to control an environment such that live food creatures (e.g., insects) are induced by their natural behavior to exit a container to a carnivore interface. Such embodiments may, for example, advantageously reduce or eliminate moving parts. Embodiments with reduced or eliminated moving parts may advantageously reduce damage to the food creatures during dispensing. Embodiments with reduced or eliminated moving parts may, for example, advantageously reduce manufacturing cost and/or user maintenance requirements.

As depicted, the LFPIF 105 further includes guide surface 145. The guide surface 145, as depicted, are raised ridges on a floor of the chamber. The live food creature 125 may, for example, in the retaining mode 100, ignore and/or crawl around the guide surface 145. In the dispensing mode 101, however, as the live food creature 125 is seeking to escape the controllable light source 140, the live food creature 125 may be induced according to surface taxis characteristics to follow the guide surface 145. Accordingly, the guide surface 145 may advantageously guide the live food creature 125 towards the aperture 115 to be dispensed (e.g., to a waiting carnivore).

In various embodiments, the LFPIF 105 may, by way of example and not limitation, be configured for positive phototaxis. For example, the live food creatures 125 may be black soldier flies. Many flies (e.g., including black soldier flies) may be positive phototaxis creatures. The retaining mode 100 may, for example, be associated with the controllable light source 140 being ON. The dispensing mode 101 may, for example, be associated with the controllable light source 140 being OFF. In some embodiments, the LFPIF 105 may be dynamically configurable between different modes. Accordingly, a user may advantageously reconfigure the LFPIF 105 based on a current target live food. For example, a user may dispense roaches, and then switch to black soldier flies. Accordingly, the user may change the LFPIF 105 from a negative phototaxis configuration for the roaches to a positive phototaxis configuration for the black soldier flies.

In some embodiments the configuration may be done manually (e.g., by operating a switch). In some embodiments the configuration may be done automatically. For example, a user may enter a type of live food being used. A controller may retrieve a predetermined profile associated with that food creature. The controller may generate signals based on the predetermined profile to configure the LFPIF 105 and/or the controller based on the predetermined profile. The predetermined profile may, for example, define behaviors (e.g., phototaxis, surface taxis). The predetermined profile may, for example, define timing (e.g., 30-second dispensing, 1 hour dispensing, every 4-hour dispensing). In some embodiments the predetermined profile may, for example, be determined based on a target carnivore.

Figure 2:
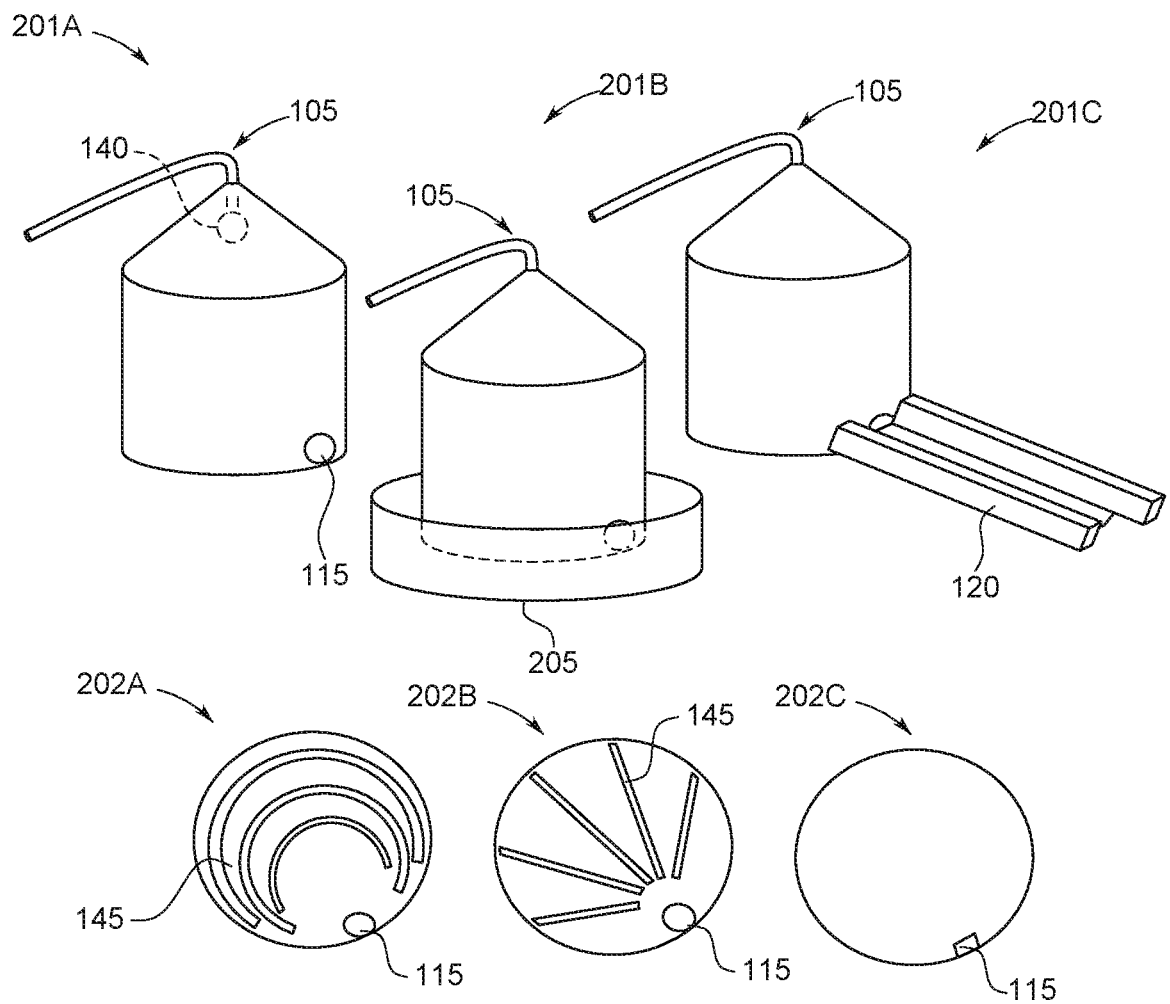
FIG. 2 depicts exemplary LFPIF configurations with exemplary guide surfaces and exemplary accessories.

FIG. 2 depicts exemplary LFPIF configurations with exemplary guide surfaces and exemplary accessories. In a first example 201A, the LFPIF 105 is provided with a chamber having the aperture 115. The chamber of the LFPIF 105 further is provided with the controllable light source 140. In some embodiments, as depicted, the controllable light source 140 may be an (electromagnetic) light source (e.g., LED). In some embodiments the controllable light source 140 may include a source of ambient light. For example, the controllable light source 140 may include an aperture into the chamber. The aperture may be controllably occludable (e.g., by a shutter). In some embodiments the controllable light source 140 may include a light tube bringing in light from an ambient source (e.g., an exterior).

In a second example 201B, the LFPIF 105 is disposed within a tray 205. For example, the tray 205 may delay or prevent escape of a dispensed food creature into a general environment (e.g., the carnivore's enclosure, a pet owner's house). The tray 205 may, for example, be clear (as depicted). In some embodiments the tray 205 may be at least partially opaque.

In a third example 201C, the LFPIF 105 is provided with a carnivore interface 120. The carnivore interface 120, as depicted, is configured as a channel. The channel may, for example, advantageously guide a dispensed food creature (e.g., via surface taxis) towards a waiting carnivore.

In a first example surface 202A, a floor of the chamber of the LFPIF 105 is provided with the guide surfaces 145 configured as nested curves of progressively decreasing radii. All of the curves may, for example, be substantially tangential to the aperture 115. Each curve may, for example, be interrupted by the aperture 115. Accordingly, the guide surface 145 may, for example, advantageously guide food creatures distributed across the floor of the LFPIF 105 towards the aperture 115 (e.g., surface taxis in combination with phototaxis).

In some embodiments the guide surface 145 may, for example, be a raised surface (e.g., a 'ridge'). In some embodiments, by way of example and not limitation, the guide surface 145 may, for example, include a lowered surface (e.g., a 'groove'). In some embodiments the guide surface 145 may, for example, include a different texture (e.g., rough vs smooth, shiny vs matte) than the surrounding surface. Some such embodiments may, for example, otherwise have a (nominal) height substantially equal to the surrounding surface. In some embodiments the guide surface 145 may be provided on a surface other than the floor. For example, the guide surface 145 may be provided on the wall and/or ceiling of the LFPIF 105.

In a second example surface 202B, a floor of the chamber of the LFPIF 105 is provided with the guide surfaces 145 configured as substantially linear features converging towards the aperture 115. In a third example surface 202C, a floor of the chamber of the LFPIF 105 is provided with no guide surface 145. In the depicted example shown in the third example surface 202C, the aperture 115 is substantially rectangular.

Figure 3:
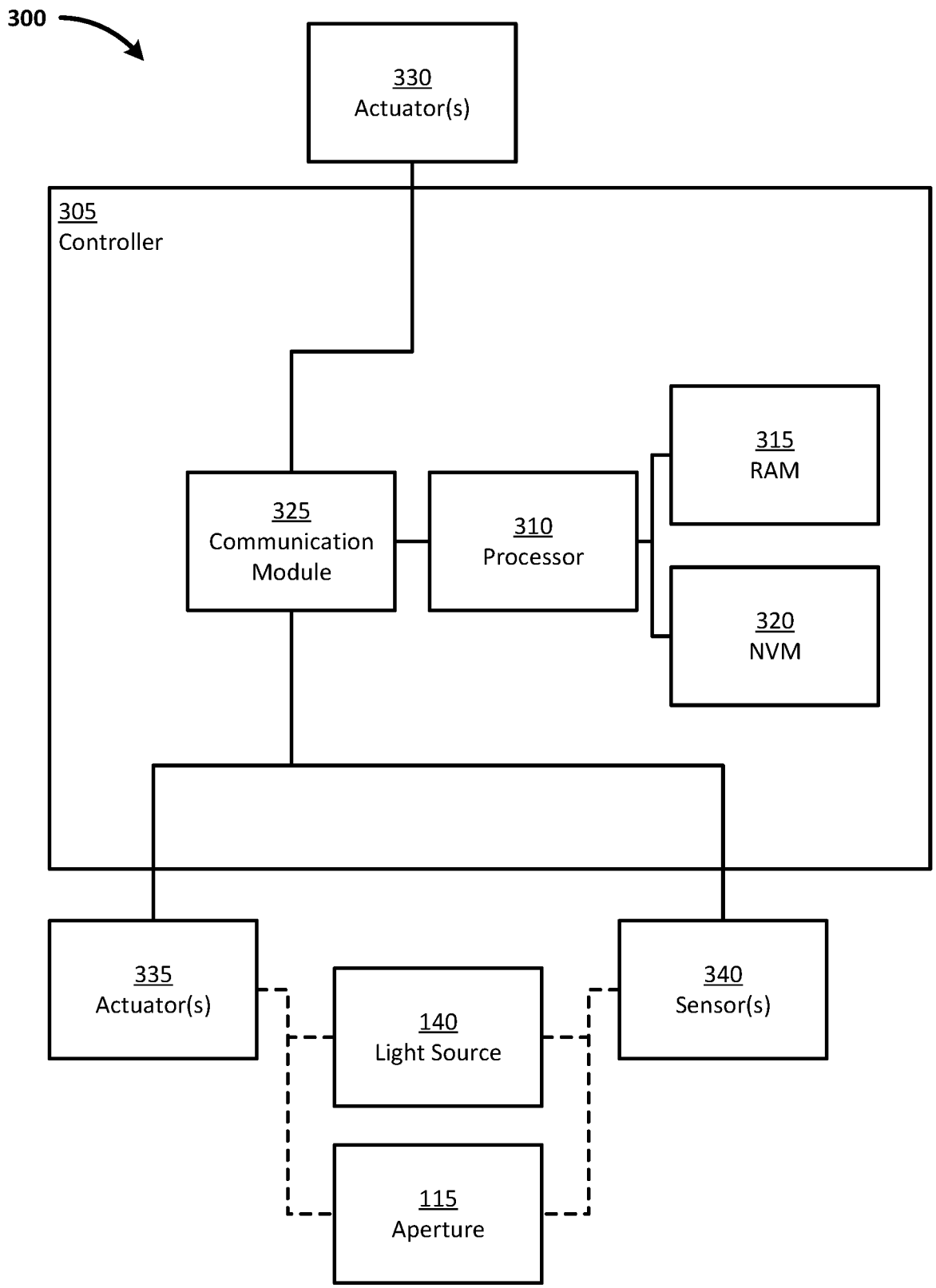
FIG. 3 depicts a block diagram of an exemplary LFPIF.

FIG. 3 depicts a block diagram of an exemplary LFPIF. An LFPIF 300 includes, in the depicted example, a controller 305. The controller 305 includes a processor 310. The processor 310 may, for example, include one or more (micro)processors. The processor 310 is operably coupled to a random-access memory module (a RAM 315). The RAM 315 may, for example, include one or more RAM modules. The processor 310 is operably coupled to a non-volatile memory module (an NVM 320). The NVM 320 may, for example, include one or more NVM devices. For example, the RAM 315 and/or the NVM 320 may store at least a portion of one or more programs of instruction configured to be executed by the processor 310. In some embodiments, the NVM 320 and/or the RAM 315 may include predetermined profile(s), such as associated with the user(s), a target carnivore(s), and/or target food creature(s).

The processor 310 is operably coupled to a communication module 325. The communication module 325 may, for example, be configured to communicate wirelessly and/or wired. For example, the communication module 325 may be configured such that the controller 305 can communicate between a LFPIF 105 and an input interface(s) 330. In some embodiments the interface(s) 330 may, for example, include a portable computing device (e.g., the mobile device 110).

The communication module 325 may, for example, operably couple the processor 310 to one or more actuators 335 and/or one or more sensors 340. For example, an actuator 335 may be configured to operate the controllable light source 140. In some embodiments one or more actuators 335 may be configured to selectively operate a (dispensing, light controlling) aperture (e.g., a shutter, door, gate, over the aperture) based on signals generated by the controller 305.

The one or more sensors 340 may, for example, be configured to monitor a light level. In some embodiments the one or more sensors 340 may include a photoelectric sensor configured to monitor light level(s) in and/or outside of the chamber of the controller 305. In some embodiments the one or more sensors 340 may include, by way of example and not limitation, a proximity sensor configured to detect a presence of a carnivore at a carnivore interface. In some embodiments, the one or more sensors 340 may include a timer and/or clock. In some embodiments the one or more sensors 340 may, for example, be configured to determine a number of food creature dispensed (e.g., via video analysis).

In some embodiments the controller 305 may be configured as an integrated circuit. Some embodiments may, for example, omit a dedicated processor.

In some embodiments the interface(s) 330 may, for example, include a switch. The interface(s) 330 may be connected directly to the controllable light source 140, for example. In some embodiments the one or more actuators 335 and/or the one or more sensors 340 may, for example, be omitted. For example, a manual embodiment may omit the one or more actuators 335 for the controllable light source 140 and the aperture 115. There may be, for example, no control over the aperture 115. Control of the controllable light source 140 may, for example, be provided by a switch (e.g., on/off).

Figure 4A:
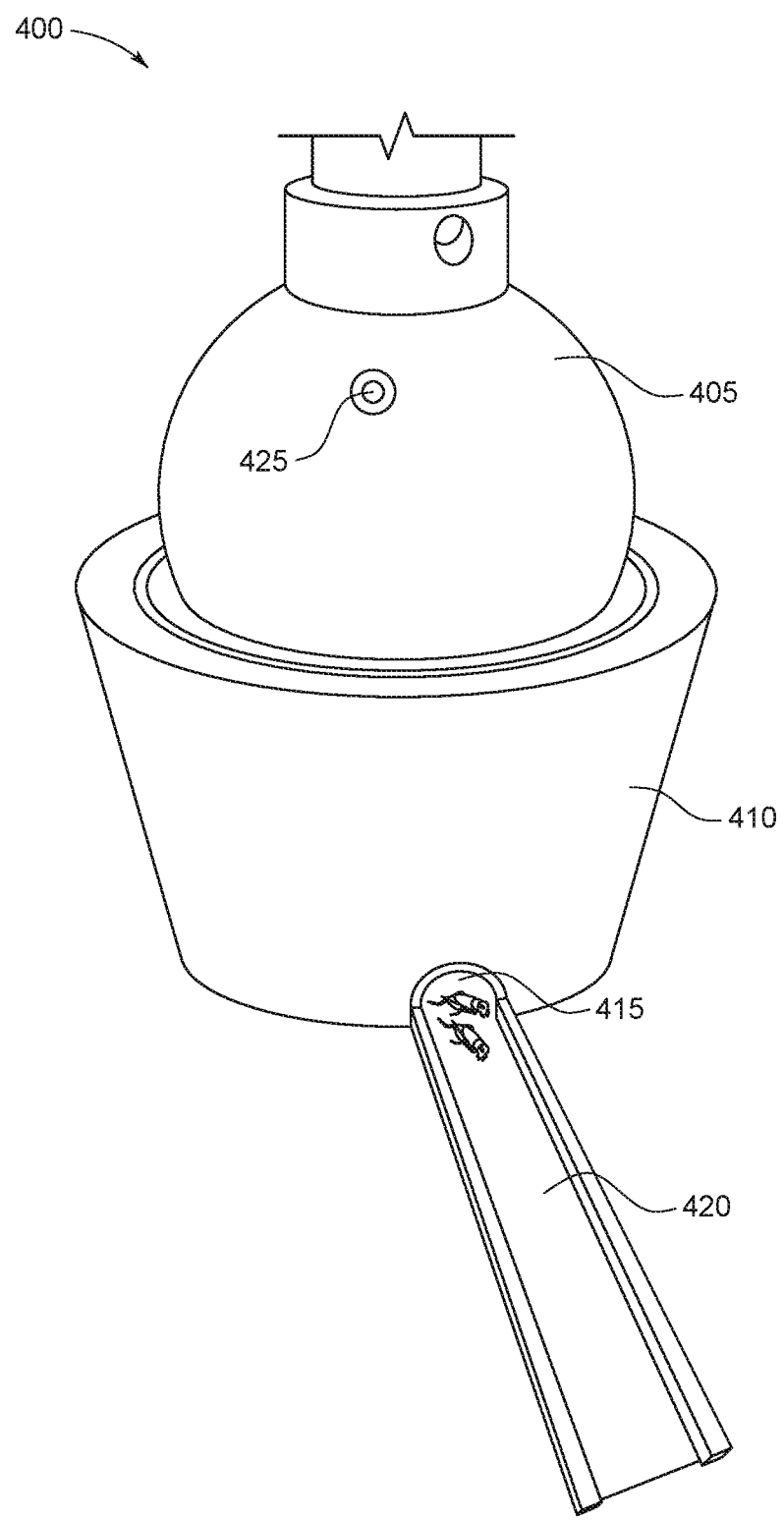
FIG. 4A depicts an exemplary negative phototaxis LFPIF in an illustrative use-case scenario.

FIG. 4A depicts an exemplary negative phototaxis LFPIF in an illustrative use-case scenario. A chamber of an LFPIF 400 is defined by an upper housing 405 and a lower housing 410. The upper housing 405 and/or the lower housing 410 may, for example, be at least partially opaque (e.g., light-blocking). The chamber may, for example, have ventilation features that do not allow excessive light to enter the chamber. The (interior) sides of the chamber may, for example, be smooth. Such embodiments may, for example, inhibit climbing by food creatures. In some embodiments, a texture (e.g., smooth, patterned) of the chamber surfaces (e.g., walls, ceilings, floors, dividers, guide surfaces) may be provided to enhance climbing by food creatures.

In the depicted example, the lower housing 410 is provided with an aperture 415 communicating between the interior of the chamber and the exterior. The aperture 415 may, for example, be configured to be large enough for a food creature of choice to exit. In some embodiments a size of the aperture 415 may, for example, be adjustable (e.g., by a sliding gate, a rotating shutter).

The aperture 415 may, by way of example and not limitation, one or more ramps or paths for the food creatures to follow once escaping. As depicted, a carnivore interface 420 is provided. The carnivore interface 420 is configured as a channel configured to guide a dispensed food creature (e.g., crickets, as shown) towards a waiting carnivore (not shown) at an end of the carnivore interface 420.

In some embodiments the aperture 415 may include a drop into a smooth container (not shown) that does not allow the food creature to return to the chamber. In a negative phototaxis configuration, the aperture 415 may appear to lead into a darkened area when viewed from the inside of the chamber.

A controllable light source (not shown) may, for example, be interior to the upper housing 405. The controllable light source may, for example, be approximately the same size as the top of the upper housing 405. The light source may, for example, selectively illuminate substantially the entire hide. In some embodiments the light source may be selected and/or configured such that the light source produces little or no heat. In some embodiments, the light source may be configured to generate sufficient heat (e.g., a minimum predetermined temperature) such that a thermotaxis response is induced. In some embodiments the light may, for example, be connected to a switch, a timer, or a smart device. The light may, for example, illuminate (substantially) all of the internal structures.

When the LFPIF 400 is used in a dark location, for example, an area external to the chamber may be illuminated, for example, at the aperture 415. For example, in a negative phototaxis configuration, in a retaining mode, the LFPIF 400 may be configured such that the light source and/or another light source shines near the aperture 415. Accordingly, the aperture 415 will appear brighter than the interior of the chamber, such that food creatures having negative phototaxis attributes are advantageously induced to avoid exiting the LFPIF 400 through the aperture 415.

In some embodiments, the LFPIF 400 may further be provided with chemicals (e.g., scents) and/or surfaces such that a retaining mode and/or dispensing mode induces a multi-factor tactic response. For example, the LFPIF 400 may dispense attractive scents in the chamber during a retaining mode to induce positive chemotaxis. The LFPIF 400 may, for example, dispense repelling chemicals near an aperture to strengthen negative chemotaxis away from the dispensing aperture(s). A selectively operable guide surface may be provided. For example, a selectively operable guide surface may be operated to selectively present a repelling guide surface near a dispensing aperture(s) to induce negative thigmotaxis during a retaining mode.

In some embodiments, internal structures may be substantially optically clear. In some embodiments, structures (e.g., internal structures, housing wall(s)) may be tinted corresponding to a desired tactic response from a food creature. As an illustrative example, a structure may be tinted blue to enhance phototaxis.

For example, a guide surface 145 (not shown) may be configured to reduce or eliminate shadows and/or appreciable shade when the light is turned on. For example, the guide surface 145 may advantageously provide a clear and unobstructed path to the aperture 415. The guide surface 145 may, for example, be layered horizontally and/or vertically.

In some embodiments, a guide surface 145 may be configured to produce intentional shade (e.g., from a controllable light source 140). For example, the guide surface 145 may be positioned relative to a controllable light source 140 such that shadow(s) is generated in a (predetermined) region(s) guiding the food creature towards a dispensing aperture.

In some embodiments, the guide surface 145 may have a contrasting surface color and/or reflection. For example, the guide surface 145 may have a darkened surface color and/or may have a less reflective surface relative to other regions of the chamber. Such embodiments may, for example, advantageously guide a food creature towards or away from a dispensing aperture(s).

Figure 4B:
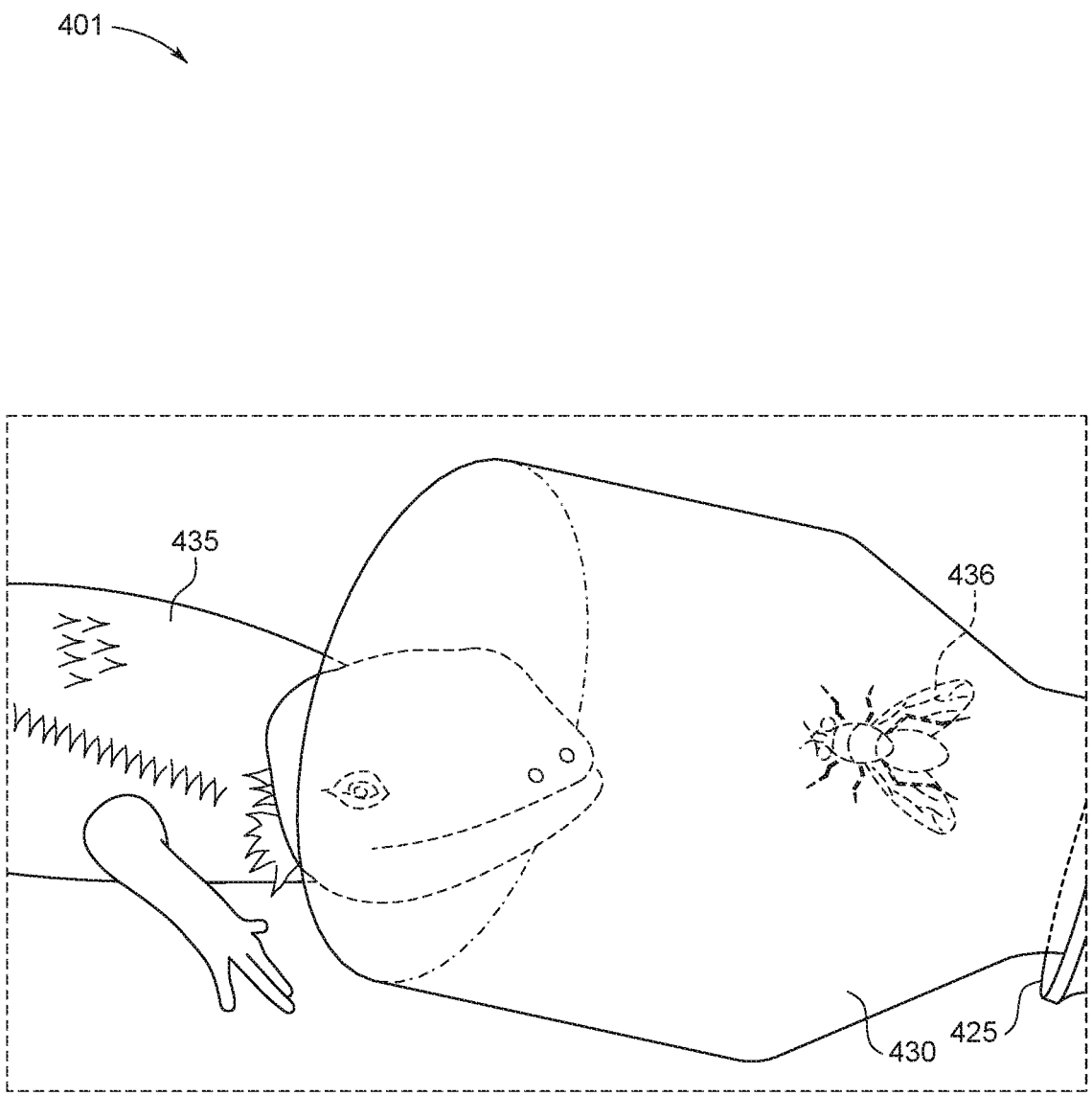
FIG. 4B depicts an exemplary LFPIF carnivore interface being used by an insectivore in an illustrative use-case scenario.

FIG. 4B depicts an exemplary LFPIF carnivore interface being used by an insectivore in an illustrative use-case scenario. In the depicted example 401, an LFPIF 425 is provided with a carnivore interface 430. As depicted, a carnivore 435 may, for example, be a lizard. The LFPIF 425 may be configured to (selectively) dispense live food 436 (e.g., flies such as black soldier flies) to the carnivore 435.

As an illustrative example, the live food 436 may climb out of the darkened LFPIF onto the carnivore interface 430 (e.g., within the carnivore interface 430), and the carnivore 435 (e.g., an insectivore) can reach the live food 436 before it escapes (e.g., flies away). Such embodiments may advantageously increase feeding efficiency and/or reduce a number of unwanted creatures in a pet environment (e.g., a home).

Figure 4C:
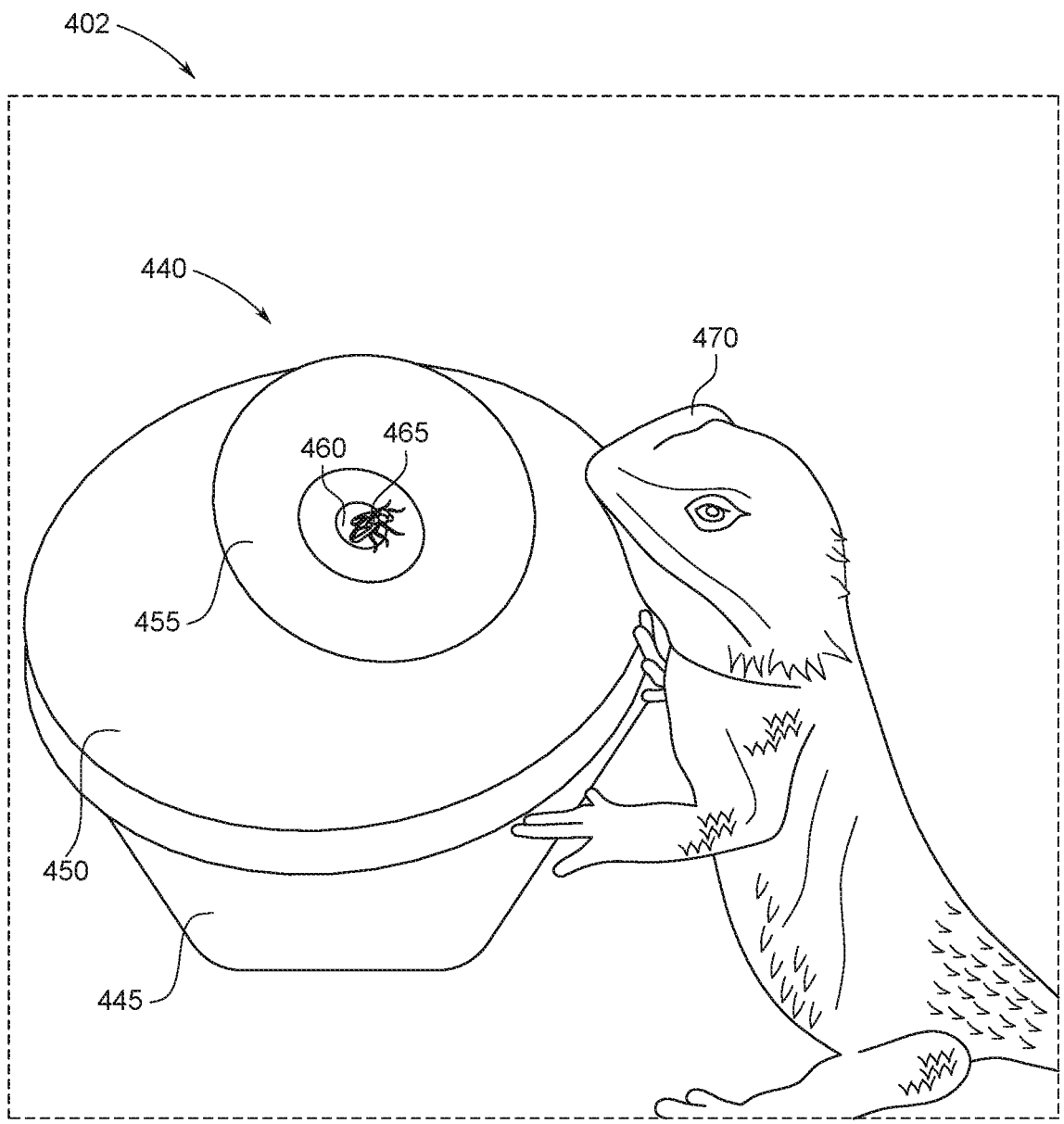
FIG. 4C depicts an exemplary LFPIF in an illustrative use-case scenario.

FIG. 4C depicts an exemplary LFPIF in an illustrative use-case scenario. In the depicted example 402, an LFPIF 440 is provided with a lower housing 445 and an upper housing 450 which may cooperate to form a chamber. The chamber may receive food creatures (e.g., black soldier flies). In some embodiments, the LFPIF 440 may be used to collect the food creatures. In the depicted example, the upper housing 450 is provided with a carnivore interface 455 having an aperture 460. The LFPIF 440 is shown with an insectivore 470 (lizard) waiting at an end of the carnivore interface 455. Food creatures 465 (e.g., flies) may climb out of the darkened interior chamber of the LFPIF 440 toward the light and the waiting insectivore 470.

Figure 5A:
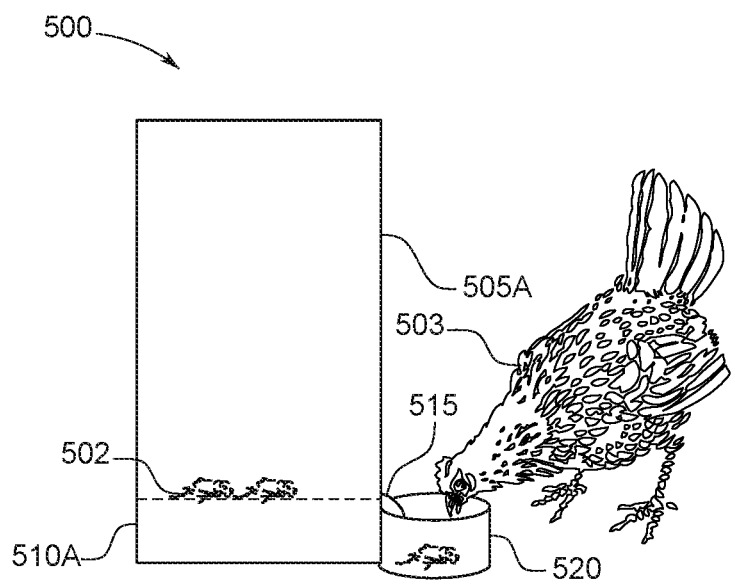
FIG. 5A depicts an exemplary LFPIF with a completely opaque housing.

FIG. 5A depicts an exemplary LFPIF with a completely opaque housing. An LFPIF 500 includes a housing defining a chamber, including an upper region 505A and a lower region 510A. In the depicted example, the upper region 505A and the lower region 510A are substantially entirely opaque. For example, the wall may be constructed of a material with low optical transmissivity. The transmissivity of the wall (e.g., the wall itself, a coating on the wall) may be selected such that the interior of the chamber is darker than the exterior of the chamber (e.g., at least the upper region 505A at least partially blocks ambient light).

A controllable light source 140 (not shown) may be provided in the LFPIF 500. The light source may be selectively operated to place the LFPIF 500 into a dispensing mode (e.g., ON for negative phototaxis). Live food creatures 125 (e.g., crickets, as shown) may thereby be induced to exit the LFPIF 500 via a dispensing aperture 515 into a carnivore interface 520.

As depicted, the carnivore interface 520 is a collection reservoir. For example, the collection reservoir may be a bowl configured to retain the food creatures (e.g., at least temporarily) for access by a carnivore (e.g., a chicken, as shown). The collection reservoir may, for example, advantageously prevent the live food from escaping. Such embodiments may, by way of example and not limitation, reduce feeding costs (e.g., by reducing a number of creatures that escape) and/or unwanted creatures in an environment (e.g., the carnivore's enclosure, a zoo, a pet owner's house).

In some embodiments the upper region 505A and the lower region 510A may, for example, be releasably coupled. For example, the upper region 505A may be separable from the upper region 505A. In the uncoupled mode, the upper region 505A may, for example, be releasably coupled to a collecting module. For example, the upper region 505A may be configured to releasably couple to a food creature collecting funnel and/or tube (e.g., insect collector). Once food creatures are collected, the upper region 505A may be decoupled from the collecting module and coupled to the lower region 510A for dispensing the caught food creatures to a carnivore.

Figure 5B:
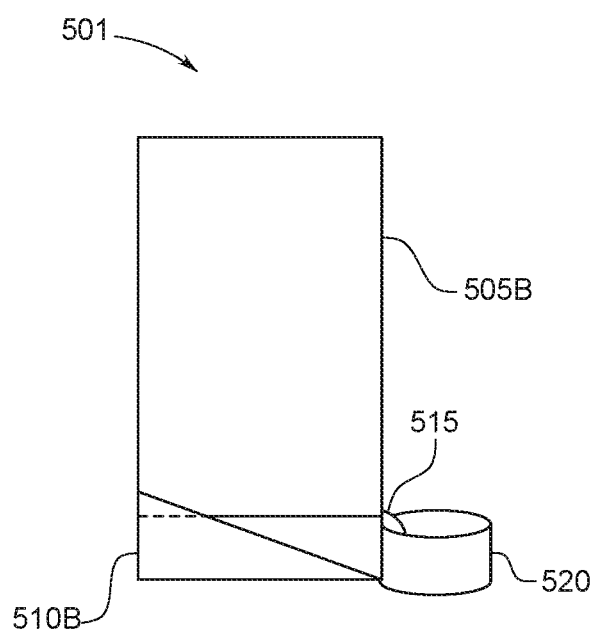
FIG. 5B depicts an exemplary LFPIF with a partially opaque housing.

FIG. 5B depicts an exemplary LFPIF with a partially opaque housing. An LFPIF 501 includes a housing defining a chamber, including an upper region 505B and a lower region 510B. In the depicted example, the upper region 505B is mostly translucent. In some embodiments the upper region 505B may, for example, be substantially entirely constructed of a material with high optical transmissivity. The lower region 510B is depicted as being partially opaque and partially translucent. For example, the wall may be constructed of a material with low optical transmissivity. The transmissivity of the wall (e.g., the wall itself, a coating on the wall) may be selected such that the interior of the chamber is at least partially illuminated by ambient light than the exterior of the chamber (e.g., at least the upper region 505A at least partially blocks ambient light).

Food creatures may, for example, be added to the LFPIF 501 at the time of feeding. The food creatures (e.g., insects) may exit the LFPIF 501, for example, seeking darkness by exiting through the dispensing aperture 515.

As depicted with reference to both LFPIF 500 and LFPIF 501, the dispensing aperture 515 is provided with a deflection shield (shown slanted from the housing into the carnivore interface 520). The deflection shield may, for example, deflect food creatures exiting the interior into the collection reservoir. The deflection shield may, for example, advantageously prevent a dispensed food creature from jumping from the aperture past the collection reservoir.

In various embodiments (e.g., with respect at least to LFPIF 500 and LFPIF 501), such as for jumping insects, the collection reservoir may be configured to be too narrow and tall to allow the food creatures to jump, but large enough that a carnivore can reach all of the food creatures in the collection bowl. In some embodiments, for example, an upper aperture of the carnivore interface 520 may be provided with an inward facing lip to deflect jumping food creatures back down into the collection area.

In some embodiments the housing (e.g., the upper region 505A, the upper region 505B, the lower region 510A, and/or the lower region 510B) may be controllably light transmissive. For example, the housing may be selectively light transmissive. In some embodiments the housing may be selectively shrouded. In some embodiments a light transmissive portion(s) of the housing may be selectively covered. In some embodiments a physical attribute of the wall (e.g., polarization, orientation of light blocking particles) may be selectively controlled (e.g., by a controller such as the controller 305). Accordingly, various embodiments may advantageously be controlled to selectively attract, retain, and/or dispense food creatures. Various such embodiments may be configured, for example, into a positive phototaxis mode. Such embodiments may, for example, contain a controllable light source. In some embodiments an LFPIF such as shown in FIGS. 5A-B may, for example, be configured in a positive phototaxis mode using a controllable light source but omitting a controllably light transmissive housing.

Figure 6:
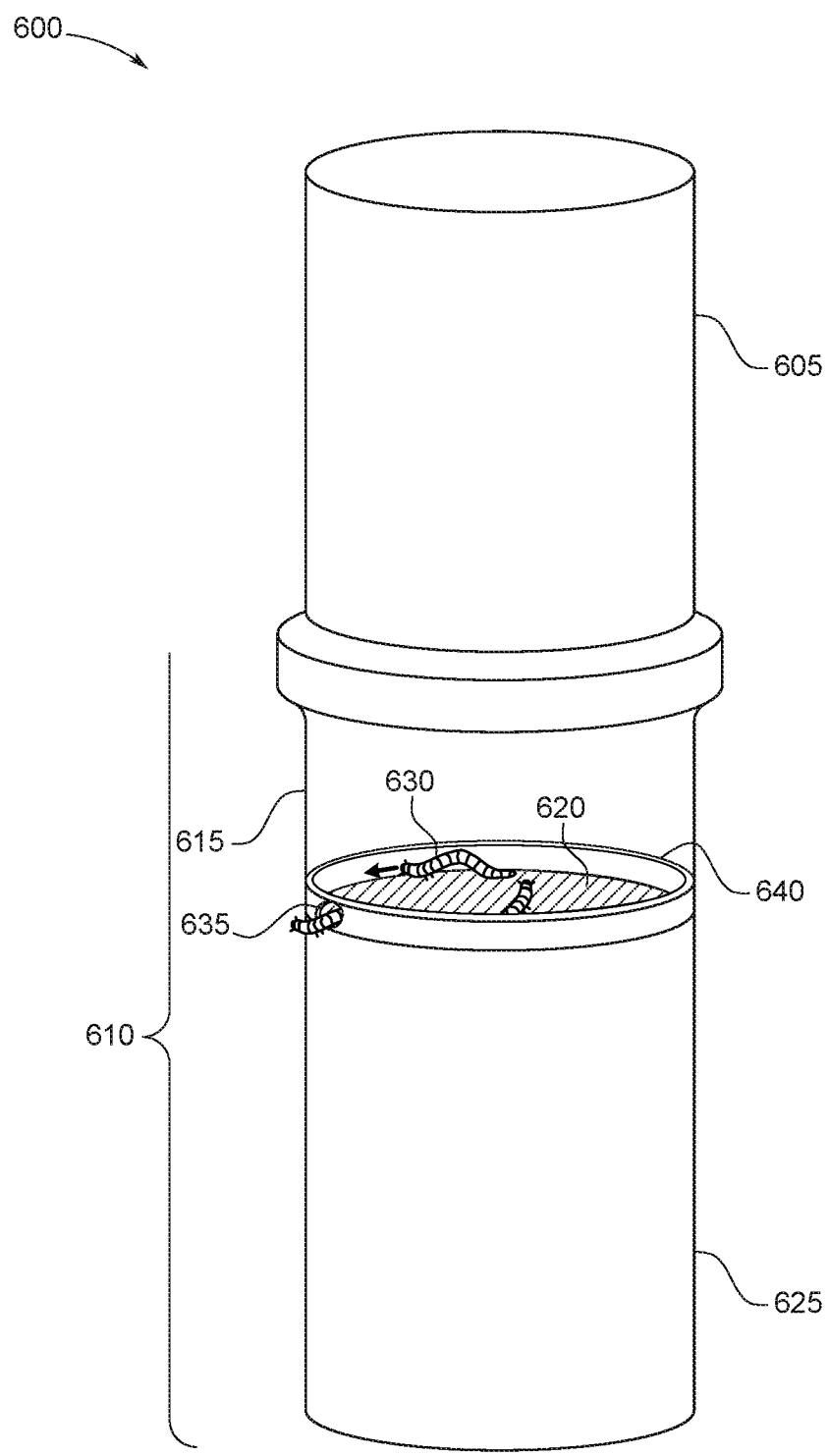
FIG. 6 depicts an exemplary live food surface-taxis inducing feeder (LFSIF) configured for negative surface-taxis and coupled to an exemplary live food reservoir in a dispensing mode.

FIG. 6 depicts an exemplary live food surface-taxis inducing feeder (LFSIF) configured for negative surface-taxis and coupled to an exemplary live food reservoir in a dispensing mode. In a dispensing mode 600, a live food reservoir 605 is releasably coupled to an LFSIF 610. When coupled to the live food reservoir 605, a wall 615 defining a receiving aperture engages the live food reservoir 605 such that the receiving aperture defined by the wall 615 is brought into register with the aperture into the live food reservoir 605. Accordingly, an interior of the wall 615 and an interior of the live food reservoir 605 are placed in communication. The live food reservoir 605 and the wall 615 together, therefore, form a dispensing chamber.

The LFSIF 610 is provided with a retention member 620 substantially spanning an entire aperture into a collection chamber 625 defined by at least one wall. The LFSIF 610 is provided with a dispensing aperture 635. As depicted, the dispensing aperture 635 is provided in the wall 615. In the depicted example, the dispensing aperture 635 may double as a carnivore interface. In some embodiments, an additional carnivore interface may be provided (e.g., a tube such as disclosed at least with reference to FIG. 4B, a ramp such as disclosed at least with reference to FIG. 4A).

The live food reservoir 605 may contain food creatures 630. As an illustrative example, the live food reservoir 605 may contain larvae (e.g., darkling beetle larvae, as shown) in a substrate (e.g., 'worm' food, litter, bedding). When the dispenser is operated into a dispensing mode, substantially all of the loose substrate may pass through the retention member 620 (e.g., due to gravity) into the collection chamber 625 and the food creatures 630 may be retained in the dispensing chamber (defined by the wall 615 and the live food reservoir 605) by the retention member 620 such that the food creatures 630 are induced to exit the dispensing chamber through the dispensing aperture 635.

As an illustrative example, the live food reservoir 605 may be a commercially available container (e.g., bucket) of larvae in substrate. The LFSIF 610 may be attached to the live food reservoir 605 with the live food reservoir 605 in an upright orientation (a mouth of the bucket, defining an aperture into the bucket, oriented upwards). The assembly of the live food reservoir 605 and the LFSIF 610 may then be operated into the dispensing mode 600 such that the contents of the live food reservoir 605 fall onto the retention member 620, contained by the wall 615. Thence, the substrate at least partially falls through the retention member 620, exposing the food creatures 630.

The food creatures 630 may, by way of example and not limitation, have negative surface taxis characteristics, at least with respect to exposure. The food creatures 630 may, for example, have negative phototaxis characteristics. Accordingly, exposing the food creatures 630 may cause the food creatures 630 to seek shelter. The food creatures 630 may migrate towards a perimeter of the dispensing chamber (e.g., towards the wall 615). The food creatures 630 may then continue to seek shelter and travel around the perimeter of the dispensing chamber until they come to the dispensing aperture 635.

In some embodiments, such as depicted, the LFSIF 610 is provided with a guide surface 640. The guide surface 640 may, for example, be provided at least partially around an inner perimeter of the wall 615. The guide surface 640 may, for example, be provided along substantially all of an inner perimeter of the wall 615. The guide surface may, for example, be provided with a surface (e.g., texture, pattern, reflectivity) at least partially attractive to the food creatures 630. Accordingly, the food creatures 630 may be attracted towards the guide surface 640. The guide surface 640 may define a substantially continuous path terminating at the dispensing aperture 635. Accordingly, the food creatures 630 may follow the guide surface 640 to the dispensing aperture 635.

In some embodiments the retention member 620 may, for example, be a screen. The retention member 620 may, for example, be patterned and/or otherwise textured to lead the food creatures 630 towards the dispensing aperture 635. For example, the retention member 620 may be provided with a spiral pattern and/or reducing radius curves (e.g., as disclosed at least with reference to first example surface 202A) which may, for example, advantageously lead the food creatures 630 toward the dispensing aperture 635. In some embodiments, patterning may, for example, include physical texturing. In some embodiments, the retention member 620 may be provided with a color inducing negative taxis (e.g., negative phototaxis). In some embodiments, the retention member 620 may be provided with a chemical inducing negatived chemotaxis.

In various embodiments the LFSIF 610 may, for example, be provided with a controllable light source. For example, the LFSIF 610 may be provided with a controller (e.g., as disclosed at least with reference to FIG. 3). As depicted, the wall 615 may, for example, be clear. In some embodiments the wall 615 may be at least partially opaque.

Figure 7:
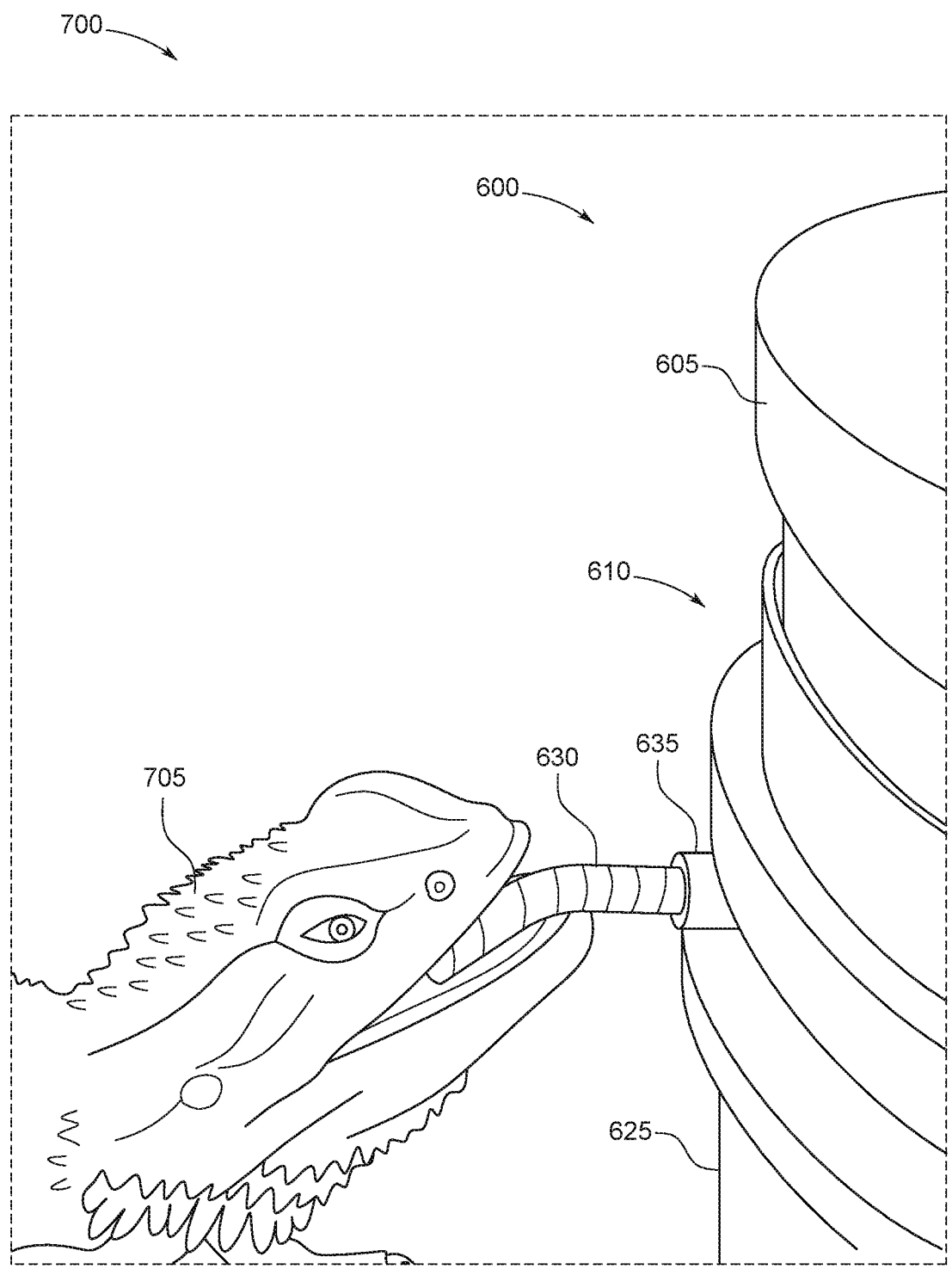
FIG. 7 depicts an exemplary LFSIF such as depicted in FIG. 6 in an illustrative use-case scenario.

FIG. 7 depicts an exemplary LFSIF such as depicted in FIG. 6 in an illustrative use-case scenario. In an illustrative dispensing scenario 700, the live food reservoir 605 is coupled to the LFSIF 610 and the assembly is operated into the dispensing mode 600. The dispensing aperture 635 is provided with a carnivore interface (a tube). A carnivore 705 (e.g., a reptile such as a bearded dragon, as depicted) captures the food creatures 630 as it exits the dispensing aperture 635.

Figure 8:
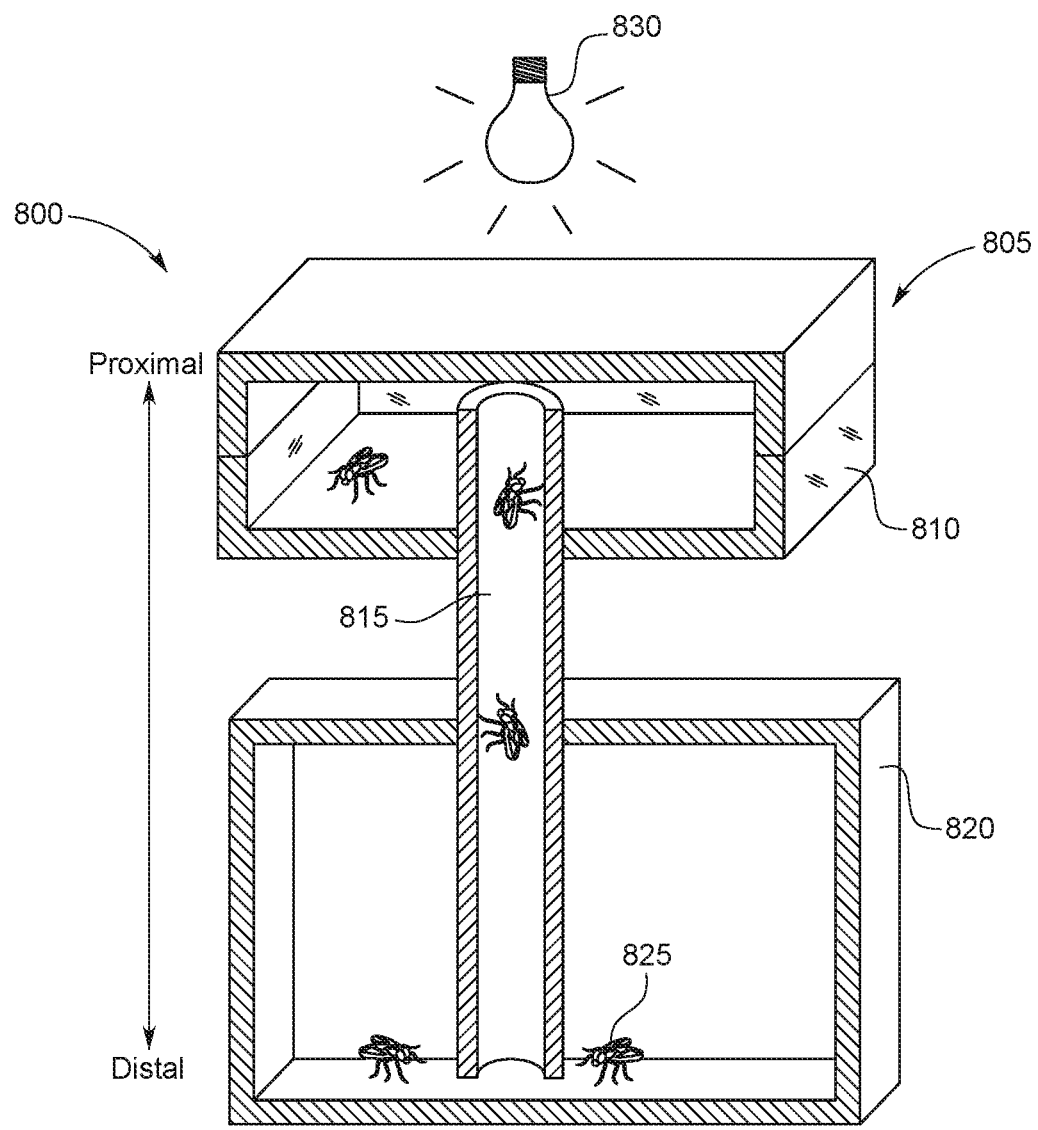
FIG. 8 depicts an exemplary live food phototaxis-inducing collector (LFPIC) in an illustrative use-case scenario.

FIG. 8 depicts an exemplary live food phototaxis-inducing collector (LFPIC) in an illustrative use-case scenario. An LFPIC 800 includes a collection module 805. The collection module 805 is provided with a light blocking wall region 810. The collection module 805 is coupled to a conduit 815 such that a proximal end of a lumen of the conduit 815 is in communication with an interior of the collection module 805. The collection module 805 is (releasably) assembled with a live food reservoir 820. As depicted, the collection module 805 is placed over the live food reservoir 820, with a distal end of the conduit 815 extending into an interior of the live food reservoir 820 containing food creatures 825 (e.g., black soldier flies, as depicted). Accordingly, the interior of the collection module 805 and the interior of the live food reservoir 820 may be in communication via the lumen of the conduit 815.

The food creatures 825 may have one or more taxis characteristics. For example, the food creatures 825 may have phototaxis characteristics. The food creatures 825 may, for example, have surface taxis characteristics (thigmotaxis). A light source 830 may, for example, be operated ON (as depicted). Accordingly, the interior of the collection module 805 may be (at least partially) illuminated. The food creatures 825 may, for example, have positive phototaxis characteristics. Accordingly, the food creatures 825 may be induced to crawl up the conduit 815 and into the collection module 805. The light blocking wall region 810 may, for example, cause the food creatures 825 to migrate towards a perimeter of the collection module 805 seeking light, thereby reducing clustering at the proximal end of the conduit 815. Various such embodiments may advantageously enable collection of food creatures from a reservoir without direct handling of the food creatures. Such embodiments may advantageously reduce allergies of humans, escapes of food creatures, and/or enable enlisting of assistance in feeding insectivores, for example.

In some embodiments a light source may be placed in the live food reservoir 820. Such embodiments may, for example, be configured for negative phototaxis food creatures (e.g., crickets, roaches). The collection module 805 may, for example, be (selectively) darkened. For example, in various embodiments the collection module 805 and/or the live food reservoir 820 may be provided with a controller (e.g., as disclosed at least with reference to FIG. 3).

In some embodiments the food creatures 825 may have positive surface taxis characteristics. For example, an inner wall of the conduit 815 may, for example, be textured. In some embodiments the texturing may include guide surfaces oriented towards the collection module 805. Accordingly, the food creatures 825 may be induced to travel up the conduit 815 and into the collection module 805.

Once a desired number of food creatures 825 are collected into the collection module 805, the collection module 805 may be disassembled from the live food reservoir 820. The collection module 805 may, for example, then be operated into a dispensing mode. For example, the collection module 805 may be coupled to a lower region 510A and/or 510B such as disclosed at least with reference to FIGS. 5A-B. In some embodiments the collection module 805 may be placed in communication with a dispenser (e.g., via the conduit 815). An illumination level of the collection module 805 may be selectively darkened. In some embodiments the wall region 810 may, for example, be omitted (e.g., the wall region 810 may not be any different than other regions of the wall of the collection module 805).

In some embodiments, the live food reservoir 820 may, for example, be provided with a (selectively applied) darkening cover. The darkening cover, when applied to cover the live food reservoir 820, may blocks light from substantially all areas except the conduit 815. In some embodiments, a darkening cover may be removed during collection (e.g., for negative phototaxis creatures). The conduit 815 may, for example, be darkened. Accordingly, the food creatures 825 may be induced to travel to the conduit 815. The conduit 815 may be lighter than the collection module 805. Accordingly, the food creatures 825 may be induced to travel up the conduit 815 and into the collection module 805.

In some embodiments the collection module 805 may be provided with a detachable darkening cover. In some embodiments the collection module 805 may be constructed of controllably optically transmissive material (e.g., coating, walls). For example, the collection module 805 may be provided with photo changing plastic and/or glass.

In some embodiments, the collection module 805 may be provided with a detachable feeding spout (e.g., carnivore interface) In various embodiments, the container may omit any tube or spout.

In various embodiments, the conduit 815 a proximal end of the conduit 815 may flare outward to allow flying food creatures (e.g., flying insects) to land on it and climb out into the collection module 805. As depicted, the proximal end of the conduit 815 is positioned in the collection module 805 near to the clear end of the container (e.g., the upper portion of the collection module 805). In various embodiments, the conduit 815 may, for example, be retracted so it is close to the dark side of the container (e.g., due to the light blocking wall region 810) and attached to a feeding spout.

Various embodiments may be provided with a feeding spout. For example, the removable feeding spout may selectively couple to the conduit 815. For example, the feeding spout may provide an inverted surface for flying food creatures to crawl upon but not to reach the light from above.

As depicted in an illustrative example, the food creatures 825 may be positive phototaxis insects in the live food reservoir 820. Light is available outside the enclosure via a sunlight space and/or the (artificial) light source 830. The collection module 805 is attached to the live food reservoir 820 via the conduit 815. The live food reservoir 820 is darkened using a darkening cover and/or mechanism. The insects fly toward the collection module 805 light and crawl up the conduit 815. The proximity of the proximal end of the conduit 815 to the (top) wall of the collection module 805 makes it unlikely for the (flying) insects to return to the enclosure but is large enough for the insects to enter. Once insects are in the collection module 805, it is disconnected from the live food reservoir 820. The darkening cover may be attached to the clear portion of the collection module 805, leaving the tube illuminated. The darkened collection module 805 may be placed with an insectivore(s) and the insects may be induced to leave the collection module 805 through the conduit 815 such that they are dispensed to the insectivore. The conduit 815 may, for example, have a feeding spout that encourages the insects to collect on an inverted (illuminated) surface. The insectivore can reach under the inverted surface to eat the insects.

Figure 9:
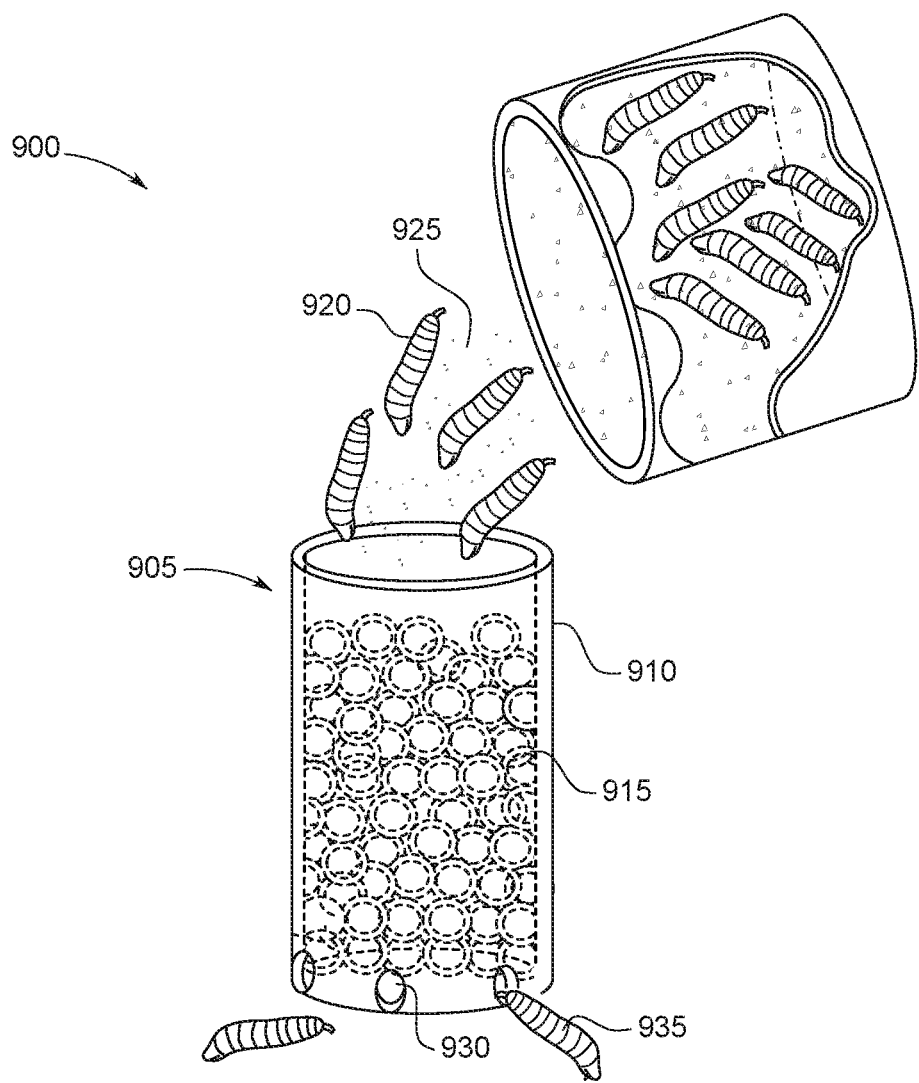
FIG. 9 depicts an exemplary live food surface-taxis inducing cleaner (LFSIC) in an illustrative use-case scenario.

FIG. 9 depicts an exemplary live food surface-taxis inducing cleaner (LFSIC) in an illustrative use-case scenario. In an illustrative cleaning scenario 900, an LFSIC 905 includes a wall defining a chamber 910. The chamber 910 is provided with cleaning substrate 915. Food creatures 920 (e.g., black soldier fly larvae, as depicted) mixed with debris 925 are dumped into the chamber 910. The food creatures 920 may, for example, have surface taxis characteristics. For example, the cleaning substrate 915 may be relatively dry. The food creatures 920 may seek to avoid dry material. Accordingly, the food creatures 920 may travel through the cleaning substrate 915 seeking to find a more desirable environment. Dispensing apertures 930 are provided spaced away from an opening into the chamber 910. Accordingly, the debris 925 may travel through the cleaning substrate 915 and exit the dispensing apertures 930 as cleaned live food 935. Such embodiments may advantageously clean food creatures from undesirable debris 925 (e.g., food bits, waste products, frass) and/or other material covering their skins. The cleaning substrate 915 may, for example, inedible by the food creatures 920. Various embodiments may advantageously prevent a user from having to handle the food creatures 920 directly. Such embodiments may allow non-caretaker users (e.g., family members not willing to manually handle the food creatures 920) and/or reduce development of allergies (e.g., of human handlers and/or caretakers) to the food creatures 920 induced by direct contact.

In various embodiments dispensing apertures 930 may be provided with or replaced by a screen(s) having apertures larger than the food creatures 920 but smaller than the cleaning substrate 915.

In some embodiments, the LFSIC 905 may be disposed in a collection reservoir and/or collection track. A carnivore may, for example, have access to the LFSIC 905. For example, the cleaned live food 935 may be consumed by the carnivore(s) as it emerges from the dispensing apertures 930.

Figure 10:
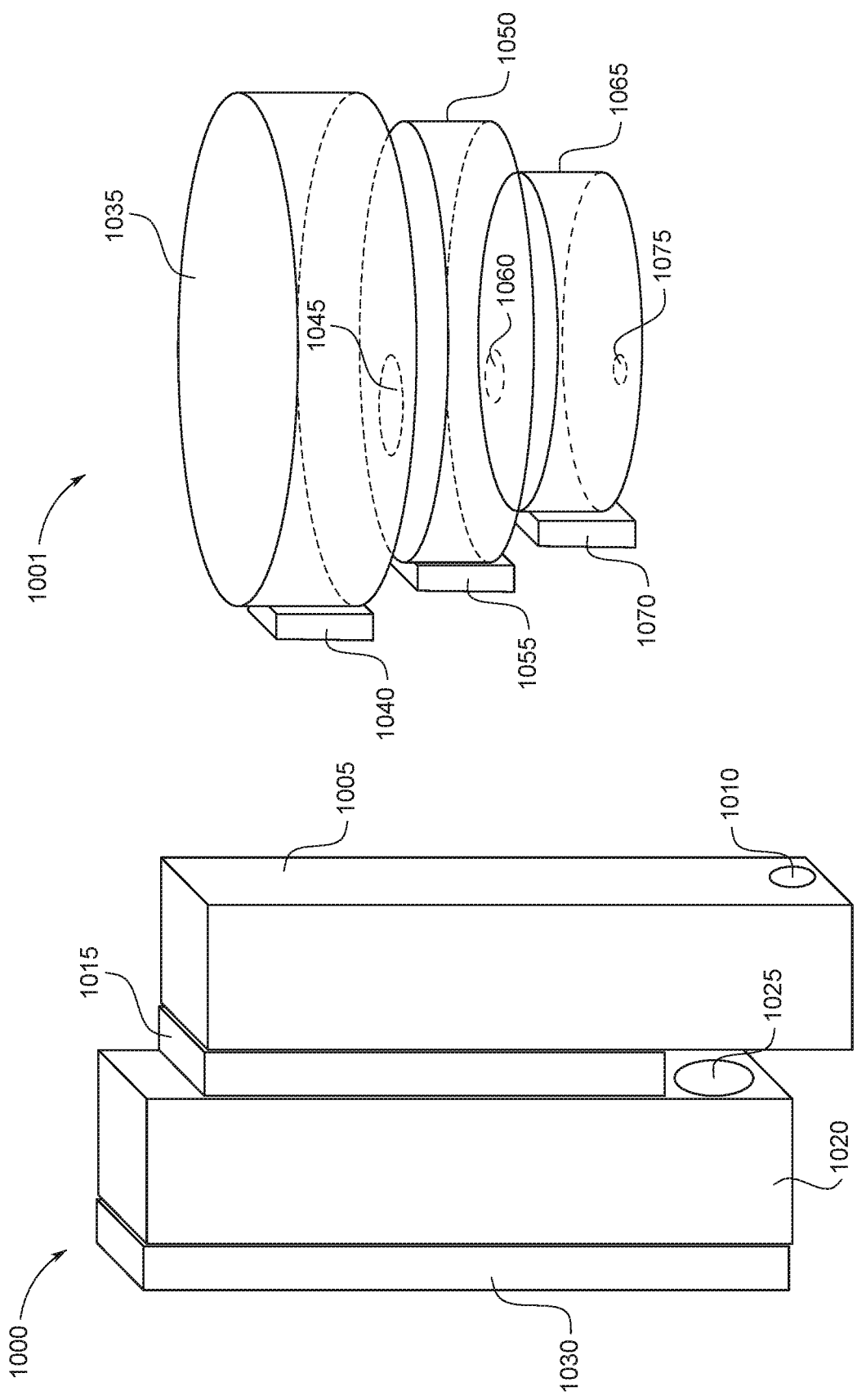
FIG. 10 depicts exemplary live food phototaxis-inducing sorters (LFPISs).

FIG. 10 depicts exemplary live food phototaxis-inducing sorters (LFPISs). An LFPIS 1000 is provided with a first chamber 1005. For example, food creatures of various sizes may be disposed in the first chamber 1005. The first chamber 1005 is provided with a first aperture 1010. A light source 1030 may be operated to selectively illuminate the first chamber 1005 (e.g., ON for negative phototaxis creatures, OFF for positive phototaxis creatures). The food creatures may seek to exit the first aperture 1010. Only food creatures smaller than the first aperture 1010 may exit. Accordingly, the food creatures may be sorted based on size.

The LFPIS 1000 is further provided with a conduit 1015 to a second chamber 1020. The conduit 1015 may, for example, be optically transmissive to allow light from the light source 1030 to illuminate the first chamber 1005 even when the conduit 1015 is closed. In some embodiments the conduit 1015 may be positioned, as depicted, such that the food creatures may have to climb to reach the conduit 1015. Accordingly, smaller food creatures may preferentially exit the first aperture 1010. In some embodiments the conduit 1015 may be selectively openable (e.g., operated manually, operated by a controller such as disclosed at least with reference to FIG. 3). For example, the conduit 1015 may only be opened after a predetermined threshold (e.g., rate of food creatures exiting the first aperture 1010, predetermined time duration).

Food creatures too large to exit the first aperture 1010 may exit the first chamber 1005 via the conduit 1015. The second chamber 1020 is provided with a second aperture 1025. Food creatures smaller than the second aperture 1025 may be induced to exit the second chamber 1020 via the second aperture 1025 based on selective illumination of the second chamber 1020 by the light source 1030. Food creatures too large for the second aperture 1025 may be retained in the LFPIS 1000. Accordingly, in the depicted example, the food creatures may be sorted into three sizes. Various embodiments may advantageously enable sorting of food creatures automatically based on innate behavior. Such embodiments may advantageously prevent direct handling of the food creatures. In various embodiments, for example, sizing food creatures for feed and aging purposes may be important across many husbandry applications (e.g., in insect husbandry). Some embodiments may be provided with more or less sorting levels (e.g., 1 sorting level, 3 or more sorting levels).

In some embodiments, aging may, for example, be implemented and/or enhanced by controlled phototaxis. For example, in some food creatures, phototaxis is more developed with age. Accordingly, various embodiments (e.g., such as disclosed at least with reference to FIG. 10), may advantageously provide light gradients such that phototaxis is induced to separate food creatures by age. Some embodiments may add light gradient in addition to graduated apertures. Some embodiments may, for example, implement light gradient without graduated apertures. Some embodiments may implement (age) sorting by, for example, other taxis characteristics in food creatures with age-dependent tactic responses (e.g., chemotaxis, thigmotaxis).

An LFPIS 1001 is provided with a first chamber 1035. A first light source 1040 is configured to (selectively) illuminate an interior of the first chamber 1035. The first chamber 1035 is communicably coupled to a second chamber 1050 by a first aperture 1045. Food creatures of various sizes may be disposed in the first chamber 1035 (e.g., by an opening, not shown). The first light source 1040 may be operated to induce the food creatures to seek to exit the first chamber 1035. Food creatures able to fit through the first aperture 1045 may exit the first chamber 1035 and enter the second chamber 1050. Food creatures unable to fit through the first aperture 1045 may be retained in the first chamber 1035.

The second chamber 1050 is provided with a second light source 1055 operably coupled to the second chamber 1050. The second light source 1055 may be operated to induce the food creatures to seek to exit the second chamber 1050. Due to gravity, the food creatures may not seek the first aperture 1045. In some embodiments a surface around the first aperture 1045 in the second chamber 1050 may prevent the food creatures from approaching the first aperture 1045 to enter the first chamber 1035 again.

The second chamber 1050 is communicably coupled to a third chamber 1065 by a second aperture 1060. The second aperture 1060, as depicted, is smaller than the first aperture 1045. Food creatures small enough to fit through the second aperture 1060 may enter the third chamber 1065 via the second aperture 1060. Food creatures too large to fit may be retained in the second chamber 1050.

The third chamber 1065 is provided with a light source 1070 operably coupled to illuminate the third chamber 1065. A third aperture 1075 (smaller than the second aperture 1060) is provided as an exit from the third chamber 1065. The light source 1070 may be selectively operated to induce the food creatures to exit the third chamber 1065. Accordingly, those food creatures small enough to fit through the third aperture 1075 may exit the third chamber 1065 via the third aperture 1075, while those too large to fit may be retained in the third chamber 1065. Accordingly, the food creatures may be sorted into four different size ranges. The size ranges may be predetermined based on the relative sizes of the apertures.

In various embodiments, the third aperture 1075 may lead into a collection container. In some embodiments the third aperture 1075 may be coupled to a carnivore interface. In some embodiments, the food creatures may be collected by a collection module (e.g., such as disclosed at least with reference to FIG. 8) and then dispensed into the LFPIS (e.g., LFPIS 1000, LFPIS 1001).

Although various embodiments have been described with reference to the figures, other embodiments are possible. For example, although an exemplary system has been described with reference to the figures, other implementations may be deployed in other industrial, scientific, medical, commercial, and/or residential applications.

In various embodiments, food creatures may be moved to and from a container based on their phototaxis for the purpose of making them available to a carnivore for food. For example, dark-loving food creatures (negative phototaxis) may be placed in a container that provides them a hiding space(s). When the hiding space(s) is brightly lit, the food creatures (e.g., insects) may flee toward a potentially darker space and to an carnivore (e.g., insectivore). In various embodiments, a food creature naturally drawn to light (positive phototaxis) may be transferred to a container that is darkened, inducing them to leave the container seeking light, and so become accessible to a carnivore.

In various embodiments, carnivores may include mammals. In some embodiments, carnivores may include fish. Carnivores may, for example, include insects. Carnivores may include reptiles. Some embodiments may be configured for carnivores including marsupials. In some embodiments, target carnivores may, for example, include birds. Carnivores may, by way of example and not limitation, include arachnids. Various embodiments may be configured for carnivores including crustaceans. In various embodiments, carnivores may, for example, include amphibians (e.g., frogs, toads, salamanders). In some embodiments, carnivores may, by way of example and not limitation, include any animal that eats members of the kingdom animalia.

Various embodiments, including embodiments described in relation to the figures, may be adapted to include ridges and spirals that guide the food creatures to an escape hole to organize delivery for the carnivore. Various embodiments, including embodiments described in relation to the figures, may be provided with substrate(s) for cleaning the food creature and separating it from its frass. In various embodiments, food may be provided in the path of the light or dark photo stimuli.

Various embodiments may be adapted for specific food creatures. Embodiments may leverage, by way of example and not limitation, roaches' affinity for running along an edge (e.g., a baseboard). Some embodiments may leverage, for example, ants' affinity for running inside a cavity (e.g., running into and along a crack). Various embodiments may leverage many food creatures' dislike of being exposed (e.g., many larvae, many annelids).

In various embodiments, desired behavior of food creatures may be achieved by methods including, for example, smells (e.g., insects may move away from a smell associated with other dead insects, and/or move towards a food substance and so toward a sorting or dispensing device). In various embodiments a desired behavior of food creatures may be induced using a downward slope (e.g., insects may preferentially climb down if they cannot go up). In some embodiments, a desired behavior of food creatures may be induced using (deep) substrate (e.g., insects may preferentially climb through dry material if they cannot go up). In some embodiments a desired behavior of food creatures may be induced by controlling material moisture levels (e.g., insects may preferentially leave dry material when other routes exist). In various embodiments, multiple behavior characteristics may be leveraged such as, by way of example and not limitation, dispensers employing a combination of features to induce behavior based on both phototaxis and surface affinity characteristics of target insects.

In various embodiments, desired surface affinity-related behavior of food creatures (e.g., insects) may be achieved by apparatus that employ methods including, by way of example and not limitation, placement of painted surfaces that are reflective or nonreflective (e.g., insects may preferentially walk on a nonreflective surface). Some embodiments may, for example, employ placement of surfaces with different colors. Some embodiments may employ placement of rough surfaces (e.g., insects may only be able to climb vertically on rough surfaces). Some embodiments may employ placement of ridges or raised areas (e.g., insects may preferentially follow ridges to an opening or other sorting method). Various embodiments may employ placement of corners and/or "hiding valleys" (e.g., insects may follow valleys and corners toward an exit or sorting method). In some embodiments, straight and/or curved edges (e.g., insects may preferentially follow defined edges) may be employed.

In various embodiments, a feeder may include and/or be coupled to a habitat. For example, an LFPIF (such as LFPIF 105) may be configured with an internal habitat (e.g., including food and/or water source). Some embodiments may include a commercial habitat (e.g., commercial roach house). The habitat may be disposed within the feeder. The feeder may have guide surfaces (e.g., on the floor). A light may be operated into a dispensing mode, and the food creatures may exit the habitat and follow the guide surfaces until they exit into escape resistant bowl.

In various embodiments, guide surfaces may be configured to guide food creatures towards a desired direction. For example, food creatures may be able to detect light but may not be able to detect a direction of the source of the light. As an illustrative example, many insects cannot tell a direction of light so just 'scramble' until they reach an expected surface (e.g., a crevice, a wall, a crack). Such insects may innately follow such a surface 'expecting' to reach a desired light level (e.g., darkness) by following the surface. Accordingly, various embodiments provided with guide surface(s) may advantageously provide food creatures guidance towards a desired direction (e.g., towards a light source, away from a light source). In various embodiments, a location of a light source may be varied. For example, a light source may be provided next to a dispensing aperture. The food creatures (e.g., even negative phototaxis food creatures) may not be able to determine where the light source is. The guide surface(s) may guide the food creatures towards the dispensing aperture towards lower light, past the light source.

In some embodiments, by way of example and not limitation, a dispensing aperture may be positioned such that a perimeter surface and/or edge is configured to act as a guide surface(s). For example, a dispensing aperture located substantially on level with a floor of a chamber may advantageously enable the floor to act as a guide surface. Such a configuration may, for example, advantageously enable a perimeter edge (e.g., defined by a junction of a wall with the floor) to act as a guide surface towards the aperture. In various embodiments, a corner (e.g., two or more intersecting walls) may advantageously act as a guide surface towards a dispensing aperture(s) located substantially at a (junction) of the walls.

In some embodiments, a carnivore interface may be suspended. For example, the carnivore interface 120 depicted in third example 201C in FIG. 2 may be suspended in the air. The food creatures may thereby be trapped on the ramp. They may avoid dropping off the ramp, but may also avoid re-entering the feeder due, for example, to phototaxis. Accordingly, the food creatures may advantageously be retained at the carnivore interface for consumption by the carnivore.

In various embodiments, a controllable light source may include, for example, a controllably light transmissive region (e.g., of a dispenser, collector, sorter). The light transmissive region may, for example, include a portion of a housing (e.g., corresponding to a portion of an interior wall, corresponding to a portion of an exterior wall). In some embodiments, the transmissive region may include substantially an entirety of a housing.

The controllably light transmissive region may be selectively light transmissive. In some embodiments, for example, the region may be selectively shrouded. In some embodiments a light transmissive region may be selectively covered. In some embodiments a physical attribute of the wall (e.g., polarization, orientation of light blocking particles) may be selectively controlled (e.g., by a controller such as the controller 305). Accordingly, various embodiments may advantageously be controlled to selectively attract, retain, and/or dispense food creatures. Various such embodiments may be configured, for example, into a positive phototaxis mode. Various embodiments may be configured, for example, into a negative phototaxis mode.

In various embodiments, a light transmissive region may, for example, be constructed using 'switchable glass.' For example, some embodiments may be provided with electrochromic material configured to respond to electric pulses (e.g., from the controller) to change light transmission properties (e.g., more opaque, less opaque). In some embodiments, polymer-dispersed liquid-crystal material may be provided such that the controller may provide an (electrical) signal to operate the material into an at least partially transparent state and terminate or reduce a signal to operate the material into an at least partially opaque state. Various embodiments may, for example, include suspended particle devices having light transmissivity responsive to electrical signal(s) (e.g., generated in response to the controller). Some embodiments may, for example, include micro-blinds operable to adjust light transmission in response to controller signals. Such embodiments may, for example, advantageously be resistant to UV degradation.

In various embodiments, a (controllable) light source may provide (e.g., generate) light of varying wavelengths. For example, light may be visible to humans. Light may be visible to a (target) carnivore. By way of example and not limitation, a light source may emit ultraviolet light. In some embodiments, a light source may emit infrared light. Some embodiments may be configured such that a light source emits polarized light. A controlled light source may emit a (predetermined) spectrum of light. The spectrum may, for example, be fixed. In some embodiments the spectrum(s) may be variable. For example, some embodiments may emit a specific range of wavelengths (e.g., corresponding to red light, blue light, other colors, ultraviolet light, and/or infrared light, for example).

A light source may be configured to emit light, in some embodiments, which is invisible to humans and/or to a (target) carnivore(s). For example, a retaining light (e.g., light emitted in a retaining mode) may not be visible. Such embodiments may, for example, advantageously reduce light pollution disturbing humans and/or carnivores (e.g., during sleeping).

In some embodiments, multiple light sources may be provided. In some embodiments, a light source may be configured to selectively emit different light spectrums. For example, at least one controllable light source may emit a first (predetermined) spectrum(s) (e.g., infrared light) in a retaining mode and may emit a second (predetermined) spectrum(s) in a dispensing mode.

A light source may, by way of example and not limitation, include a single light emitting element (e.g., a light bulb). In some embodiments, a light source may include multiple light emitting elements. For example, a light source may include a string of lights. The light elements may, for example, be individually controllable. In some embodiments, a light source(s) may be configured (e.g., positioned) to produce intentional shadows. For example, a light source may be positioned relative to a structure(s) (e.g., a shadow generation module) configured to produce shadows. The light source(s) and/or structure(s) may be arranged to generate shadows controlling, for example, direction (e.g., towards, away) of a phototactic food creature relative to an aperture (e.g., a dispensing aperture).

In some embodiments, an actuator (e.g., controlling a light source) may be timed. A sensor may be provided at an aperture and/or carnivore interface, for example. The sensor(s) may count a number of food creatures dispensed. A controller may operate the light source from a dispensing mode into a retaining mode after a predetermined number of food creatures are dispensed. In some embodiments, the controller may record a number of food creatures dispensed (e.g., with a timestamp). Accordingly, various embodiments may advantageously allow a user to track the number of food creatures dispensed. Such embodiments may advantageously enable users (e.g., caretakers in a zoo) which may be required to count how many food creatures a carnivore (e.g., reptile) is provided. Such embodiments may also advantageously prevent release of food creatures into the environment. Such embodiments may advantageously enable automatic feeding, for example, in zoos which cannot release food creatures (e.g., non-native insects) into the environment.

Various embodiments may, for example, be configured to induce a thermotactic response. For example, a temperature gradient may be generated relative to a chamber, an aperture, and/or an external environment. For example, a heat source may be (selectively) activated to generate heat such that positive thermotactic food creatures are attracted (e.g., retained) and/or negative thermotactic food creatures are dispensed. In some embodiments, a cooling module may be (selectively) activated to cool a region (e.g., inner chamber) such that negative thermotactic food creatures are attracted (e.g., retained) and/or positive thermotactic food creatures are dispensed.

Some embodiments may be configured to be activated by a carnivore. For example, a feeder (e.g., LFPIF 105) may be configured to be operated into a dispensing mode in response to an input from a carnivore. The feeder may be configured such that the carnivore may, for example, actuate an input interface (e.g., button, lever) to activate the feeder. The feeder may be configured, for example, such that the feeder detects a (predetermined) position of the carnivore (e.g., within a certain range of a carnivore interface, such as for a predetermined minimum amount of time). For example, a controller (e.g., as disclosed at least with reference to FIG. 3) may be configured to respond to receive and respond to a signal corresponding to a 'request' from the carnivore. In some embodiments, the controller may operate the feeder into a dispensing mode in response to a request signal generated by a carnivore.

As an illustrative example, a carnivore may activate a feeder by physical touch. In some embodiments, a carnivore may activate a feeder, for example, by sound. Some embodiments may be configured to be activated in response to physical proximity of a carnivore. In some embodiments, a feeder may be activated in response to elimination (e.g., defecation, urination) in a predetermined area.

In some embodiments, the controller may be configured (e.g., by a predetermined profile) to activate the dispensing mode continuously (e.g., as long as the carnivore continues the request). In some embodiments the controller may be configured to activate the dispensing mode for a predetermined duration after a request. In some embodiments the controller may be configured to activate the dispensing mode during a predetermined window(s) of time (e.g., during predetermined feeding times). The predetermined duration(s) and/or window(s) may, by way of example and not limitation, be automatic (e.g., for a feeder, for a carnivore), be user-customized, or some combination thereof. In some embodiments the duration(s) and/or window(s) may, for example, be configured based on a predetermined profile.

In some embodiments the controller may, in response to a signal corresponding to activation by the carnivore, generate a corresponding command signal. The command signal may, for example, be configured to generate a message to a caretaker. The message may, for example, cause a display to be generated and presented to the caretaker including an indication that the carnivore is requesting feeding. The display may include a request for input from the caretaker. In response to the caretaker providing input approving the request, the feeder may be (automatically) operated by the controller into a dispensing mode. If the caretaker refuses or ignores the request, the controller may, for example, not be operated into the dispensing mode.

Various embodiments may, for example, include multiple simultaneous taxis-inducing stimuli. For various animals, one taxis-inducing stimuli may be stronger than another. In some animals a first taxis-inducing stimuli may be greater than a second taxis-inducing stimuli at a first relative intensity (e.g., light intensity vs chemical concentration, thermal energy level vs surface intensity), but the relative strength of response in the animal may switch at a second relative intensity. In some embodiments, simultaneous stimuli may be configured to induce opposite responses.

As an illustrative example, in a retaining mode, a feeder with roaches may be configured to present certain repelling oils (citrus, mint, cinnamon, citronella) in non-lethal concentrations near an aperture (negative chemotaxis), such that the roaches will not exit. In a dispensing mode induced by light (negative phototaxis), the feeder may activate a light source such that the roach is induced to exit through the aperture regardless of the repelling oil. In other words, the roach's phototactic response may overcome the chemotactic response.

As an illustrative example, in a retaining mode a chamber configured to control taxis of crickets may be configured with a smooth metal surface leading to an aperture such that the surface induces negative thigmotaxis in the crickets and they avoid the aperture. In a dispensing mode, a light source may be activated to induce phototaxis such that the cricket will cross the smooth surface to escape the light (e.g., phototactic response>thigmotactic response).

Different food creatures may overcome different stimuli to different degrees. Accordingly, various embodiments may be configured to control competing taxis-inducing stimuli. For example, some embodiments may vary a relative intensity of taxis-inducing stimuli.

Various embodiments may be provided with a camera. For example, the camera may be automatically turned-on during feeding. In some embodiments a controller may automatically enable the camera during feeding. A communication link between a user's portable computing device (e.g., smartphone) and the camera may, for example, be established (e.g., automatically). In some embodiments a message may be generated and transmitted to a predetermined user(s) in response to the controller operating a feeder into a dispensing mode and capturing an image(s).

Some embodiments may be configured to attract a (target) carnivore using a (predetermined) signal(s). For example, a predetermined attractant may be generated in response to and/or in preparation for a feeder being operated into a dispensing mode. As an illustrative example, a controller may be configured to cause a (predetermined) sound to be generated in association with a dispensing mode. A carnivore may, for example, advantageously learn to come to the feeder in response to the predetermined attractant. Various embodiments may, for example, generate smell(s). Various embodiments may, for example, generate visual indicia (e.g., light, icon, display, animation).

Various embodiments may be configured to feed multiple carnivores. For example, some embodiments may be provided with multiple dispensing apertures. Some embodiments may, for example, be provided with multiple carnivore interfaces. Various such embodiments may provide separate access (e.g., separate feeding regions, separate feeding compartments) to the feeder. Accordingly, multiple carnivores may be advantageously fed.

Some embodiments may, for example, selectively feed and/or monitor feeding (e.g., dispensing time, dispensing count) based on unique identification. For example, a controller (e.g., as disclosed at least with reference to FIG. 3) may (uniquely) identify a carnivore based on microchip and/or RFID tag. In some embodiments, a controller may identify a carnivore based on image analysis (e.g., using a Fourier transform). A controller may, for example, identify a carnivore by audio analysis (e.g., an audio signature). In some embodiments, a machine learning engine may monitor characteristics (e.g., audible, visual) associated with (manually) identified carnivores and generate an automatic identification model. The model may, for example, be dynamically applied to (uniquely) identify a carnivore without a tag and/or manual input.

Various embodiments may include a habitat. The habitat may, for example, support a colony of food creatures. For example, the habitat may be provided with structures adapted for reproduction and/or growth of young food creatures. In some embodiments, a sorting module may be provided (e.g., as disclosed at least with reference to FIG. 10). The sorting module may, for example, be configured to prevent premature (e.g., younger than desired to dispense as live food) food creatures from being dispensed when in a dispensing mode. In some embodiments, a sorting module may be configured to prevent adult (e.g., breeding age) food creatures from being dispensed when in a dispensing mode. In some embodiments, for example, a habitat may be communicably coupled to a feeder by a collector module (e.g., as disclosed at least with reference to FIG. 8). The collector module may, for example, be selectively operated to induce food creatures to move from the habitat to the feeder. In some embodiments, a sorting module may be provided in, before, and/or after the collector. Accordingly, various embodiments may advantageously maintain a constant supply of food creatures.

In some embodiments, a container (e.g., feeder) may be configured (e.g., sized, provided with food and/or water) to maintain a single colony of food creatures. Some embodiments may be configured for a series of different food creature types. Multiple breeding pairs may, for example, be retained inside the container by a sorting module (e.g., using a predetermined size of an aperture, using internal clear and/or opaque structures of the container) and so not dispensed to the carnivore. Very young or small prodigy may be retained so that a predetermined size range (e.g., corresponding to age range) food creatures are dispensed to the carnivore by taxis. Males or female adults of food creatures with sexual dimorphism may, for example, be selectively removed from the colony using sized sorting from selective taxis through different apertures. The colony may be maintained using standard animal husbandry for each food creature type. As an illustrative example, food and/or water/moisture for the food creatures may be contained in grooves and/or other illuminated and/or shaded areas. The food and/or water/moisture placement may be configured to not interfere with taxis (e.g., phototaxis, thigmotaxis, thermotaxis, chemotaxis) of the food creatures and/or to avoid providing unwanted hiding places. Colony size may, for example, be maintained to contain a predetermined quantity range of food creatures that both feed the carnivore and maintain a continuously breeding colony.

In various embodiments, one or more circuits may be provided (e.g., as disclosed at least with reference to FIG. 3). A circuit(s) may, by way of example and not limitation, control timing of insect release based on surface, color, sizes or other (e.g., in relation to embodiments discussed herein) to dispense a specific number of insects, insects of a particular size over a specific time, presence of an insectivore, specific input from a user(s), other appropriate control criteria, or some combination thereof.

In various embodiments, carnivores (e.g., insectivores) may be trained to use a particular feeder(s). By way of example and not limitation, some carnivores (e.g., lizards) may be 'social eaters' and so may be trained by watching other (similar) carnivores eat. Such carnivores may be trained, for example, by displaying a video of another (similar) carnivore eating with a similar feeder. In some embodiments, a carnivore may be trained to activate a dispensing mode of a (similar) feeder (e.g., having a similar activation mechanism and/or similar appearance) by a video. For example, some embodiments may include a video display configured to generate a motion image to a carnivore displaying a (similar) carnivore using (e.g., eating from, activating) the feeder.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as a 9V (nominal) battery, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A feeder for dispensing live food to a carnivore, the feeder comprising:
 a housing that is at least partially opaque, the housing defining a chamber configured to receive at least one food creature (at least one FC);
 a controlled light source selectively operable to illuminate at least part of the chamber;
 a carnivore interface in communication with the chamber via at least one permanently opened dispensing aperture and configured to present a dispensed FC to the carnivore; and,
 at least one guide surface configured to induce a thigmotactic response in the at least one FC, such that that at least one FC is guided towards the at least one permanently opened dispensing aperture and to the carnivore interface,
 wherein operation of the controlled light source in a dispensing mode induces motion of the at least one FC in the chamber towards the carnivore interface to be presented as food to the carnivore.

2. The feeder of claim 1, wherein the housing comprises a habitat configured to support life and reproduction of at least one colony of FCs.

3. The feeder of claim 2, wherein the habitat is configured to support life and reproduction of FCs for multiple feeds.

4. The feeder of claim 1, wherein:
 the at least one FC is positively phototactic, and,
 in the dispensing mode, the controlled light source is configured such that a first light intensity in the chamber is less than a second light intensity at the at least one permanently opened dispensing aperture.

5. The feeder of claim 1, wherein:
 the at least one FC is negatively phototactic, and,
 in the dispensing mode, the controlled light source is configured such that a first light intensity in the chamber is greater than a second light intensity at the at least one permanently opened dispensing aperture.

6. The feeder of claim 1, wherein the at least one FC comprises an arthropod.

7. The feeder of claim 1, wherein the carnivore comprises an insectivore.

8. The feeder of claim 1, wherein the at least one guide surface comprises a plurality of surfaces distributed across a floor interior to a boundary surface of the chamber and converging towards the at least one permanently opened dispensing aperture.

9. The feeder of claim 1, wherein:
 the controlled light source is configured to be operated into a retaining mode, and,
 in the retaining mode, the controlled light source induces the at least one FC to avoid the at least one permanently opened dispensing aperture.

10. The feeder of claim 1, wherein the controlled light source comprises ambient light external to the chamber.

11. The feeder of claim 1, wherein the controlled light source comprises a luminaire.

12. The feeder of claim 1, wherein the housing comprises a sorting mechanism configured to guide FCs within a predetermined size range away from the at least one permanently opened dispensing aperture.

13. The feeder of claim 1, wherein the carnivore interface comprises an enclosed channel extending outward from the housing to define a path of travel for the at least one FC from the at least one permanently opened dispensing aperture towards the carnivore.

14. The feeder of claim 1, wherein the controlled light source is disposed within the housing.

15. The feeder of claim 1, wherein the at least one permanently opened dispensing aperture is configured to dispense a single FC at a time.

16. A feeder for dispensing live food to a carnivore comprising:
- a housing that is at least partially opaque, the housing defining a chamber configured to receive at least one food creature (at least one FC);
- a carnivore interface in communication with the chamber via at least one dispensing aperture and configured to present a dispensed FC to the carnivore;
- a wall defining a second aperture into a second chamber; and,
- an FC retention member substantially entirely spanning the second aperture,
- wherein, when the wall is coupled to a container:
  - the container and the housing together define the chamber as a first chamber,
  - the first chamber contains the at least one FC disposed in a loose substrate,
  - the carnivore interface is in communication with the first chamber via the at least one dispensing aperture, and,
  - in a dispensing mode, the FC retention member is configured such that substantially all of the loose substrate passes through the FC retention member into the second chamber and each of the at least one FC is retained in the first chamber by the FC retention member such that the at least one FC is dispensed through the at least one dispensing aperture and to the carnivore interface.

17. The feeder of claim 16, further comprising:
- a controlled light source selectively operable to illuminate at least part of the chamber,
- wherein operation of the controlled light source in the dispensing mode induces motion of the at least one FC in the chamber towards the carnivore interface to be presented as food to the carnivore.

18. A feeder for dispensing live food to a carnivore, the feeder comprising:
- a housing that is at least partially opaque, the housing defining a chamber configured to receive at least one food creature (at least one FC);
- a controlled light source selectively operable to illuminate at least part of the chamber; and,
- a carnivore interface in communication with the chamber via at least one permanently opened dispensing aperture and configured to present a dispensed FC to the carnivore; and,
- a thermal module configured to generate a thermal gradient with respect to the at least one permanently opened dispensing aperture such that a thermotactic response is induced in the at least one FC, wherein operation of the controlled light source in a dispensing mode induces motion of the at least one FC in the chamber towards the carnivore interface to be presented as food to the carnivore.

19. A feeder for dispensing live food to a carnivore, the feeder comprising:
- a housing that is at least partially opaque, the housing defining a chamber configured to receive at least one food creature (at least one FC);
- a controlled light source selectively operable to illuminate at least part of the chamber; and,
- a carnivore interface in communication with the chamber via at least one permanently opened dispensing aperture and configured to present a dispensed FC to the carnivore; and,
- a chemical module configured to release a chemical in at least one of a retaining and a dispensing mode such that a chemotactic response is induced in the at least one FC, wherein operation of the controlled light source in the dispensing mode induces motion of the at least one FC in the chamber towards the carnivore interface to be presented as food to the carnivore.

20. A feeder for dispensing live food to a carnivore, the feeder comprising:
- a housing that is at least partially opaque, the housing defining a chamber configured to receive at least one food creature (at least one FC);
- means for selectively illuminating at least part of the chamber;
- a carnivore interface in communication with the chamber via at least one permanently opened dispensing aperture and configured to present a dispensed FC to the carnivore; and,
- at least one guide surface configured to induce a thigmotactic response in the at least one FC, such that that at least one FC is guided towards the at least one permanently opened dispensing aperture and to the carnivore interface,
- wherein selectively illuminating the at least part of the chamber in a dispensing mode induces motion of the at least one FC in the chamber towards the carnivore interface to be presented as food to the carnivore.

* * * * *